(12) United States Patent
Futa et al.

(10) Patent No.: US 7,386,618 B2
(45) Date of Patent: Jun. 10, 2008

(54) DISTRIBUTION SYSTEM, DISTRIBUTION APPARATUS, AND RECEPTION APPARATUS FOR DISTRIBUTING CONTENTS HAVING USAGE EXPIRY

(75) Inventors: Yuichi Futa, Osaka (JP); Motoji Ohmori, Hirakata (JP); Makoto Tatebayashi, Takarazuka (JP); Masaya Yamamoto, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1122 days.

(21) Appl. No.: 10/431,500

(22) Filed: May 8, 2003

(65) Prior Publication Data

US 2004/0003291 A1   Jan. 1, 2004

(30) Foreign Application Priority Data

May 9, 2002   (JP)  ............................. 2002-134195

(51) Int. Cl.
*G06F 15/16* (2006.01)
(52) U.S. Cl. .................. 709/228; 709/224; 726/27
(58) Field of Classification Search ............... 713/202; 386/83; 717/140; 709/224; 380/231; 463/29; 726/27

See application file for complete search history.

(56) References Cited

U.S. PATENT DOCUMENTS

| | | | | |
|---|---|---|---|---|
| 5,615,408 A | * | 3/1997 | Johnson et al. ............ | 455/405 |
| 5,775,994 A | * | 7/1998 | Hsu ............................ | 463/29 |
| 6,302,795 B1 | * | 10/2001 | Ito ............................... | 463/29 |
| 6,324,528 B1 | * | 11/2001 | Hillson et al. .............. | 705/400 |
| 6,470,085 B1 | * | 10/2002 | Uranaka et al. ............ | 380/231 |
| 6,477,649 B2 | * | 11/2002 | Kambayashi et al. ......... | 726/27 |
| 6,629,138 B1 | * | 9/2003 | Lambert et al. ............ | 709/224 |
| 6,678,824 B1 | * | 1/2004 | Cannon et al. ............... | 726/22 |
| 6,738,810 B1 | * | 5/2004 | Kramer et al. .............. | 709/224 |
| 6,920,567 B1 | * | 7/2005 | Doherty et al. ............... | 726/22 |
| 7,124,302 B2 | * | 10/2006 | Ginter et al. ............... | 713/189 |
| 7,158,953 B1 | * | 1/2007 | DeMello et al. ............. | 705/51 |
| 7,305,366 B2 | * | 12/2007 | Chase et al. .................. | 705/59 |
| 2002/0077985 A1 | * | 6/2002 | Kobata et al. ................ | 705/51 |
| 2002/0081097 A1 | * | 6/2002 | Matsubara et al. ........... | 386/83 |
| 2004/0243610 A1 | * | 12/2004 | Ishiguro et al. ............. | 707/100 |
| 2005/0183072 A1 | * | 8/2005 | Horning et al. ............. | 717/140 |

FOREIGN PATENT DOCUMENTS

JP    2000-164810    6/2000

\* cited by examiner

*Primary Examiner*—William Vaughn, Jr.
*Assistant Examiner*—Greg Bengzon
(74) *Attorney, Agent, or Firm*—Wenderoth, Lind & Ponack, L.L.P.

(57) ABSTRACT

A reception apparatus includes a first timer and sends to a distribution apparatus a first date-time clocked by the first timer. The distributing apparatus includes a second timer, and generates expiry information based on a difference obtained by subtracting, from the first date-time, a second date-time that is clocked by the second timer. The expiry information is used to adjust a usage expiry date-time of content. The reception apparatus judges whether playback of the content is permitted based on the first timer and the expiry information. With this arrangement, unauthorized use of the content beyond the expiry date-time is prevented.

7 Claims, 15 Drawing Sheets ical content distribution system for distributing a content having a usage expiry date-time,
DISTRIBUTION SYSTEM, DISTRIBUTION APPARATUS, AND RECEPTION APPARATUS FOR DISTRIBUTING CONTENTS HAVING USAGE EXPIRY This application is based on an application No. 2002-134195 filed in Japan, the content of which is hereby incorporated by reference.

BACKGROUND OF THE INVENTION (1) Field of the Invention

The present invention relates to a content distribution system in which a distribution apparatus distributes a content with a usage expiry, and a reception apparatus plays back the content after confirming a usage permission of the content based on the usage expiry. The present invention also relates to a distribution apparatus and a reception apparatus used in the distribution system.

(2) Description of the Related Art

In recent years, there has been an ever-increasing number of business activities relating to distribution of contents such as movies and music in the form of recording mediums, for example DVDs (Digital Versatile Discs) and CDs (Compact Discs) or over communications network.

In one type of the distribution, a distributor sets an expiry of a usage right for each content, and cancels the setting in return for a fixed fee.

To this end, a distribution apparatus sends to a reception apparatus a content along with the usage expiry set for the content. Upon receipt of the content and the expiry information, the reception apparatus judges whether playback of the content is permitted and plays back the content only when it is permitted.

In addition, the distribution apparatus sends information including the usage expiry after applying a digital signature thereto. The reception apparatus verifies, prior to the usage permission judgment, the digital signature to confirm that the usage expiry has not been tampered. How digital signatures are generated and verified is described in detail in "Modern Cryptography" by Tatsuaki Okamoto and Hirosuke Yamamoto, Sangyo Shuppan (publishing company), 1997.

However, there is a problem which is described below. Dates-times clocked by two timers disposed within the transmission apparatus and the reception apparatus, respectively, are not necessarily the same due to malicious alterations or changes with time. This inconsistency in the dates-times clocked at each end may result in that the reception apparatus fails to properly judge the usage permission, so that the content is not used in compliance with the usage expiry set by the distribution apparatus.

SUMMARY OF THE INVENTION

The present invention is made in view of the above, and has an object to provide a content distribution system, a distribution apparatus, and a reception apparatus with which unauthorized usage of a content beyond a usage expiry is prevented.

(1) To achieve the object stated above, in one aspect of the present invention, a digital content distribution system for distributing a content having a usage expiry date-time, comprises: a distribution apparatus that includes a first timer operable to clock a date-time, and sends the content to a reception apparatus; and the reception apparatus that includes a second timer operable to clock a date-time, and makes a usage permission judgment of the content using a date-time clocked by the second timer, the usage expiry date-time of the content, and a difference between date-times clocked by the first and second timers.

With this construction, a usage permission of the content is made using a date-time clocked by the second timer, a usage expiry date-time of the content, and a difference between date-times clocked by the first and second timers. Consequently, the usage permission judgment is accurately made.

(2) Further, in the digital content distribution system of (1), the reception apparatus may send to the distribution apparatus a second date-time clocked by the second timer. The distribution apparatus may receive the second date-time from the reception apparatus, generate expiry information by adding, to the usage expiry date-time that is of the content and is based on the first timer, a difference calculated by subtracting from the second date-time a first date-time that is clocked by the first timer at an instant when the second date-time is received, and send the expiry information to the reception apparatus.

With this construction, the usage expiry date-time of a content is adjusted using the difference between a date-time clocked by the timer included in the reception apparatus and a date-time clocked by the timer included in the distribution apparatus. Consequently, the usage permission judgment is accurately made.

(3) In yet another aspect of the present invention, a digital content distribution apparatus for sending a content and expiry information to a reception apparatus, the expiry information relating to a usage expiry date-time of the content and being for use by the reception apparatus to make a usage permission judgment of the content, comprises: a receiver operable to receive, from the reception apparatus, a first date-time clocked by a timer included in the reception apparatus; a timer operable to clock a date-time and to output a second date-time clocked at an instant when the first date-time is received; and a sender operable to send, to the reception apparatus, the expiry information generated by adding, to the usage expiry date-time of the content, a difference calculated by subtracting the second date-time from the first date-time.

With this construction, the usage expiry date-time of a content is adjusted using the difference between a date-time clocked by the timer included in the reception apparatus and a date-time clocked by the timer included in the distribution apparatus. Consequently, the usage permission judgment is accurately made.

(4) Further, in the digital content distribution system of (1), the reception apparatus may store therein a date-time difference for adjusting a date-time clocked by the second timer, and a difference ID identifying the date-time difference, send an adjusted date-time and an adjustment ID to the distribution apparatus, the adjusted date-time being calculated by adding the date-time difference to the date-time clocked by the second timer, and the adjustment ID corresponding to the difference ID identifying the date-time difference that is used to generate the adjusted date-time. The distribution apparatus may receive the adjustment ID and the adjusted date-time from the reception apparatus, generate, upon receipt of the adjustment ID and the adjusted date-time, expiry information by adding, to the usage expiry date-time of the content, a difference calculated by subtracting from the adjusted date-time a date-time clocked by the first timer at an instant when the adjusted date-time is received, and send the expiry information and the received adjustment ID to the reception apparatus. Here, the reception apparatus may judge that usage of the content is permitted when a date-time shown by the received expiry information is later than a date-time calculated by adding, to a date-time clocked by the second timer at an instant of the judgment, a date-time difference identified by a difference ID that corresponds to the received adjustment ID.

With this construction, the usage expiry date-time of a content is adjusted using the difference between a date-time clocked by the timer included in the reception apparatus and a date-time clocked by the timer included in the distribution apparatus. Consequently, the usage permission judgment is accurately made.

(5) In yet another aspect of the present invention, a digital content distribution apparatus for sending a content and expiry information of the content to a reception apparatus, the expiry information relating to a usage expiry date-time of the content and being for use by the reception apparatus to judge a usage permission of the content, comprises: a receiver operable to receive, from the reception apparatus, a first date-time clocked by the reception apparatus and an ID identifying the first date-time; a timer operable to clock a date-time and to output a second date-time clocked at an instant when the first date-time is received; and a sender operable to send, to the reception apparatus, the received ID and the expiry information that is generated by adding, to the usage expiry date-time of the content, a difference calculated by subtracting the first date-time from the second date-time.

With this construction, the usage expiry date-time of a content is adjusted using the difference between a date-time clocked by the timer included in the reception apparatus and a date-time clocked by the timer included in the distribution apparatus. Consequently, the usage permission judgment is accurately made.

(6) In yet another aspect of the present invention, a digital content reception apparatus for receiving, from a distribution apparatus, expiry information of a content to make a usage permission judgment of the content, the expiry information being generated by the distribution apparatus using information sent from the reception apparatus, comprises: a user date-time acquiring unit operable to acquire a user date-time that is designated by a user; a timer operable to clock a date-time and to output a first date-time clocked at an instant when the user date-time is acquired; a memory unit operable to store therein a difference in association with an ID identifying the difference, the difference being calculated by subtracting the first date-time from the user date-time; a playback request acquiring unit operable to acquire a playback request for a content that is designated by the user; a sender operable to send, to the distribution apparatus, the ID and an adjusted date-time that is calculated by adding the difference to a date-time clocked by the timer at an instant when the playback request is acquired; a receiver operable to receive the ID and the expiry information from the distribution apparatus; and a judging unit operable to judge that usage of the content is permitted when a date-time shown by the received expiry information is later than a date-time calculated by adding a difference identified by the received ID to a date-time clocked by the timer at an instant of the judgment.

With this construction, the usage expiry date-time of a content is adjusted using the difference between a date-time clocked by the timer included in the reception apparatus and a date-time clocked by the timer included in the distribution apparatus. Consequently, the usage permission judgment is accurately made.

(7) Further, in the digital content distribution system of (1), the distribution apparatus may send, to the reception apparatus, a first date-time clocked by the first timer. The reception apparatus may receive the first date-time, and store a difference calculated by subtracting the first date-time from a second date-time clocked by the second timer at an instant when the first date-time is received. Here, the reception apparatus may judge that usage of the content is permitted when the usage expiry date-time of the content is later than a date-time calculated by adding the difference to a date-time clocked by the second timer at an instant of the judgment.

With this construction, although there is a difference between a date-time clocked by the timer included in the reception apparatus and a date-time clocked by the timer included in the distribution apparatus, the difference is made to fall within a predetermined value before the reception apparatus judges the usage permission. Consequently, the usage permission judgment is accurately made.

(8) In yet another aspect of the present invention, a digital content reception apparatus is for receiving, from each one of a first and a second distribution apparatus, a usage expiry date-time of a content. The digital content apparatus uses the usage expiry date-time to judge a usage permission of the content. The first and second distribution apparatuses including a first timer and a second timer, respectively, wherein the respective usage expiry date-times are based on their timers. The digital content apparatus comprises: a receiver operable to receive, from the first distribution apparatus, a first ID identifying the first distribution apparatus and a first date-time clocked by the first timer, and receive, from the second distribution apparatus, a second ID identifying the second distribution apparatus and a second date-time clocked by the second timer; a timer operable to clock a date-time and to output (i) a third date-time clocked at an instant when the first date-time is received, and (ii) a fourth date-time clocked at an instant when the second date-time is received; and a memory unit operable to store therein (i) a difference between the first date-time and the third date-time in association with the first ID, and (ii) a difference between the second date-time and the fourth date-time in association with the second ID.

With this construction, although there is a difference between a date-time clocked by the timer included in the reception apparatus and a date-time clocked by the timer included in the distribution apparatus, the difference is made to fall within a predetermined value before the reception apparatus judges the usage permission. Consequently, the usage permission judgment is accurately made.

(9) In yet another aspect of the present invention, a digital content reception apparatus for receiving, from each one of a first distribution apparatus and a second distribution apparatus that is dependent on the first distribution apparatus, a usage expiry date-time of a content to judge a usage permission of the content using the usage expiry date-time, the first and second distribution apparatuses including a first timer and a second timer, respectively, and the respective usage expiry date-times being based on their timers, comprises: a receiver operable to receive from the first distribution apparatus a first ID identifying the first distribution apparatus and a first date-time clocked by the first timer, and from the second distribution apparatus a second ID identifying the second distribution apparatus and a second date-time clocked by the second timer; a timer operable to clock a date-time and to output a third date-time clocked at an instant when the first date-time is received; and a memory unit operable to store, when the receiver receives the first ID and the first date-time, a difference between the first date-time and the third date-time in association with the second ID.

With this construction, although there is a difference between a date-time clocked by the timer included in the reception apparatus and a date-time clocked by the timer included in the distribution apparatus, the difference is made to fall within a predetermined value before the reception apparatus judges the usage permission. Consequently, the usage permission judgment is accurately made.

(10) In yet another aspect of the present invention, a digital content distribution apparatus for sending, to a reception apparatus that makes a usage permission judgment of a content using a usage expiry date-time of the content and a first timer included in the reception apparatus, the usage expiry date-time being based on a second timer included in the distribution apparatus. The digital content distribution apparatus comprises: a receiver operable to receive, from the reception apparatus, synchronization information showing that the first and second timers clock a date-time that is substantially the same; and a sender operable to send, to the reception apparatus, the content and the usage expiry date-time in response to the synchronization information.

With this construction, the distribution apparatus sends the expiry date-time of a content to the reception apparatus only after it is informed that the difference between a date-time clocked by the timer included in the reception apparatus and a date-time clocked by the timer included in the distribution apparatus falls within a predetermined value. Consequently, the usage permission judgment by the reception apparatus is made accurately.

(11) In yet another aspect of the present invention, a digital content distribution method for sending a content and expiry information to a reception apparatus, the expiry information relating to a usage expiry date-time of the content and being for use by the reception apparatus to make a usage permission judgment of the content. The method comprises: a receiving step of receiving, from the reception apparatus, a first date-time clocked by a timer included in the reception apparatus; a clocking step of clocking a date-time and outputting a second date-time clocked at an instant when the first date-time is received; and a sending step of sending to the reception apparatus the expiry information generated by adding, to the usage expiry date-time of the content, a difference calculated by subtracting the second date-time from the first date-time.

With this construction, the usage expiry date-time of a content is adjusted using the difference between a date-time clocked by the timer included in the reception apparatus and a date-time clocked in the clocking step. Consequently, the usage permission judgment is accurately made.

(12) In yet another aspect of the present invention, a digital content distribution method for sending a content and expiry information of the content to a reception apparatus, the expiry information relating to a usage expiry date-time of the content and being for use by the reception apparatus to make a usage permission judgment of the content. The method comprises: a receiving step of receiving from the reception apparatus a first date-time clocked by the reception apparatus and an ID identifying the first date-time; a clocking step of clocking a date-time and outputting a second date-time clocked at an instant when the first date-time is received; and a sending step of sending, to the reception apparatus, the received ID and the expiry information that is generated by adding, to the usage expiry date-time of the content, a difference calculated by subtracting the first date-time from the second date-time.

With this construction, the usage expiry date-time of a content is adjusted using the difference between a date-time clocked by the timer included in the reception apparatus and a date-time clocked in the clocking step. Consequently, the usage permission judgment is accurately made.

(13) In yet another aspect of the present invention, a digital content distribution method for sending, to a reception apparatus that makes a usage permission judgment of a content using a usage expiry date-time of the content and a first timer included in the reception apparatus, the usage expiry date-time based on a second timer included in the distribution apparatus. The method comprises: a receiving step of receiving, from the reception apparatus, synchronization information showing that the first and second timers clock a substantially same date-time; and a sending step of sending to the reception apparatus the content and the usage expiry date-time in response to the synchronization information.

With this construction, the expiry date-time of a content is sent to the reception apparatus only after it is informed that the difference between a date-time clocked by the timer included in the reception apparatus and a date-time clocked in the clocking step falls within a predetermined value. Consequently, the usage permission judgment by the reception apparatus is made accurately.

(14) In yet another aspect of the present invention, a digital content reception method for receiving, from a distribution apparatus, expiry information of a content to make a usage permission judgment of the content, the expiry information being generated by the distribution apparatus using information sent from the reception apparatus. The method comprises: a user date-time acquiring step of acquiring a user date-time that is designated by a user; a clocking step of clocking a date-time and outputting a first date-time clocked at an instant when the user date-time is acquired; a storing step of storing therein a difference in association with an ID identifying the difference, the difference being calculated by subtracting the first date-time from the user date-time; a playback request acquiring step of acquiring a playback request for a content that is designated by the user; a sending step of sending, to the distribution apparatus, the ID and an adjusted date-time that is calculated by adding the difference to a date-time clocked by the timer at an instant when the playback request is acquired; a receiving step of receiving the ID and the expiry information from the distribution apparatus; and a judging step of judging that usage of the content is permitted when a date-time shown by the received expiry information is later than a date-time calculated by adding a difference identified by the received ID to a date-time clocked by the timer at an instant of the judgment.

With this construction, the usage expiry date-time of a content is adjusted using the difference between a date-time clocked in the clocking step and a date-time clocked by the timer included in the distribution apparatus. Consequently, the usage permission judgment is accurately made.

(15) In yet another aspect of the present invention, a digital content reception method for receiving, from each one of a first and a second distribution apparatus, a usage expiry date-time of a content to judge a usage permission of the content using the usage expiry date-time, the first and second distribution apparatuses including a first timer and a second timer, respectively, and the respective usage expiry date-times being based on their timers. The method comprises: a receiving step of receiving, from the first distribution apparatus, a first ID identifying the first distribution apparatus and a first date-time clocked by the first timer, and receiving from the second distribution apparatus, a second ID identifying the second distribution apparatus and a second date-time clocked by the second timer; a clocking step of clocking a date-time and outputting (i) a third date-time clocked at an instant when the first date-time is received, and (ii) a fourth date-time clocked at an instant when the second date-time is received; and a storing step of storing therein (i) a difference between the first date-time and the third date-time in association with the first ID, and (ii) a difference between the second date-time and the fourth date-time in association with the second ID.

With this construction, although there is a difference between a date-time clocked in the clocking step and a date-time clocked by the timer included in the distribution apparatus, the difference is made to fall with in a predetermined value before the reception apparatus judges the usage permission. Consequently, the usage permission judgment is accurately made.

(16) In yet another aspect of the present invention, digital content reception method for receiving, from each one of a first distribution apparatus and a second distribution apparatus that is dependent on the first distribution apparatus, a usage expiry date-time of a content to judge a usage permission of the content using the usage expiry date-time, the first and second distribution apparatuses including a first timer and a second timer, respectively, and the respective usage expiry date-times being based on their timers. The method comprises: a receiving step of receiving, from the first distribution apparatus, a first ID identifying the first distribution apparatus and a first date-time clocked by the first timer, and receiving, from the second distribution apparatus, a second ID identifying the second distribution apparatus and a second date-time clocked by the second timer; a clocking step of clocking a date-time and outputting a third date-time clocked at an instant when the first date-time is received; and a storing step of storing, when the receiver receives the first ID and the first date-time, a difference between the first date-time and the third date-time in association with the second ID.

With this construction, although there is a difference between a date-time clocked in the clocking step and a date-time clocked by the timer included in the distribution apparatus, the difference is made to fall within a predetermined value before the reception apparatus judges the usage permission. Consequently, the usage permission judgment is accurately made.

(17) In yet another aspect of the present invention, a digital content distribution program for use by a distribution apparatus that sends a content and expiry information to a reception apparatus, the expiry information relating to a usage expiry date-time of the content and being for use by the reception apparatus to makes a usage permission judgment of the content. The program comprises: a receiving step of receiving, from the reception apparatus, a first date-time clocked by a timer included in the reception apparatus; a clocking step of clocking a date-time and outputting a second date-time clocked at an instant when the first date-time is received; and a sending, step of sending to the reception apparatus, the expiry information generated by adding, to the usage expiry date-time of the content, a difference calculated by subtracting the second date-time from the first date-time.

With this construction, the usage expiry date-time of a content is adjusted using the difference between a date-time clocked by the timer included in the reception apparatus and a date-time clocked in the clocking step. Consequently, the usage permission judgment is accurately made.

(18) In yet another aspect of the present invention, a digital content distribution program for use by a distribution apparatus that sends a content and expiry information of the content to a reception apparatus, the expiry information relating to a usage expiry date-time of the content and being for use by the reception apparatus to make a usage permission judgment of the content. The program comprises: a receiving step of receiving, from the reception apparatus, a first date-time clocked by the reception apparatus and an ID identifying the first date-time; a clocking step of clocking a date-time and outputting a second date-time clocked at an instant when the first date-time is received; and a sending step of sending, to the reception apparatus, the received ID and the expiry information that is generated by adding, to the usage expiry date-time of the content, a difference calculated by subtracting the first date-time from the second date-time.

With this construction, the usage expiry date-time of a content is adjusted using the difference between a date-time clocked by the timer included in the reception apparatus and a date-time clocked in the clocking step. Consequently, the usage permission judgment is accurately made.

(19) In yet another aspect of the present invention, a digital content distribution program for use by a distribution apparatus that sends, to a reception apparatus that makes a usage permission judgment of a content using a usage expiry date-time of the content and a first timer included in the reception apparatus, the usage expiry date-time based on a second timer included in the distribution apparatus. The program comprises: a receiving step of receiving, from the reception apparatus, synchronization information showing that the first and second timers clock a substantially same date-time; and a sending step of sending, to the reception apparatus, the content and the usage expiry date-time in response to the synchronization information.

With this construction, the expiry date-time of a content is sent to the reception apparatus only after it is informed that the difference between a date-time clocked by the timer included in the reception apparatus and a date-time clocked in the clocking step falls within a predetermined value. Consequently, the usage permission judgment by the reception apparatus is made accurately.

(20) In yet another aspect of the present invention, a digital content reception program for use by a reception apparatus that receives, from a distribution apparatus, expiry information of a content to make a usage permission judgment of the content, the expiry information being generated by the distribution apparatus using information sent from the reception apparatus. The program comprises: a user date-time acquiring step of acquiring a user date-time that is designated by a user; a clocking step of clocking a date-time and outputting a first date-time clocked at an instant when the user date-time is acquired; a storing step of storing therein a difference in association with an ID identifying the difference, the difference being calculated by subtracting the first date-time from the user date-time; a playback request acquiring step of acquiring a playback request for a content that is designated by the user; a sending step of sending, to the distribution apparatus, the ID and an adjusted date-time that is calculated by adding the difference to a date-time clocked by the timer at an instant when the playback request is acquired; a receiving step of receiving the ID and the expiry information from the distribution apparatus; and a judging step of judging that usage of the content is permitted when a date-time shown by the received expiry information is later than a date-time calculated by adding a difference identified by the received ID to a date-time clocked by the timer at an instant of the judgment.

With this construction, the usage expiry date-time of a content is adjusted using the difference between a date-time clocked in the clocking step and a date-time clocked by the timer included in the distribution apparatus. Consequently, the usage permission judgment is accurately made.

(21) In yet another aspect of the present invention, a digital content reception program for use by a reception apparatus that receives, from each one of a first and a second distribution apparatus, a content and a usage expiry date-time of the content, and makes a usage permission judgment of each content using the usage expiry date-time of the content, the first and second distribution apparatuses including a first timer and a second timer, respectively, and the respective usage expiry date-times being based on their timers. The program comprises: a receiving step of receiving, from the first distribution apparatus, a first ID identifying the first distribution apparatus and a first date-time clocked by the first timer, and receiving, from the second distribution apparatus, a second ID identifying the second distribution apparatus and a second date-time clocked by the second timer; a clocking step of clocking a date-time and outputting (i) a third date-time clocked at an instant when the first date-time is received, and (ii) a fourth date-time clocked at an instant when the second date-time is received; and a storing step of storing therein (i) a difference between the first date-time and the third date-time in association with the first ID, and (ii) a difference between the second date-time and the fourth date-time in association with the second ID.

With this construction, the reception apparatus judges a usage permission of a content only after the difference between a date-time clocked in the clocking step and a date-time clocked by the timer included in the distribution apparatus is made to fall within a predetermined value. Consequently, the usage permission judgment is accurately made.

(22) In yet another aspect of the present invention, a digital content reception program for use by a reception apparatus that receives a usage expiry date-time of a content from each one of a first distribution apparatus and a second distribution apparatus that is dependent on the first distribution apparatus, and makes a usage permission judgment of each content using the usage expiry date-time of the content, the first and second distribution apparatuses including a first timer and a second timer, respectively, and the respective usage expiry date-times being based on their timers. The program comprises: a receiving step of receiving, from the first distribution apparatus, a first ID identifying the first distribution apparatus and a first date-time clocked by the first timer, and receiving, from the second distribution apparatus, a second ID identifying the second distribution apparatus and a second date-time clocked by the second timer; a clocking step of clocking a date-time and outputting a third date-time clocked at an instant when the first date-time is received; and a storing step of storing, when the receiver receives the first ID and the first date-time, a difference between the first date-time and the third date-time in association with the second ID.

With this construction, the reception apparatus judges a usage permission of a content only after the difference between a date-time clocked in the clocking step and a date-time clocked by the timer included in the distribution apparatus is made to fall within a predetermined value. Consequently, the usage permission judgment is accurately made.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings.

DETAILED DESCRIPTION OF THE INVENTION

Hereinafter, description is given to embodiments of the present invention with reference to the accompanying drawings.

First Embodiment 1.1 Construction

Figure 1:
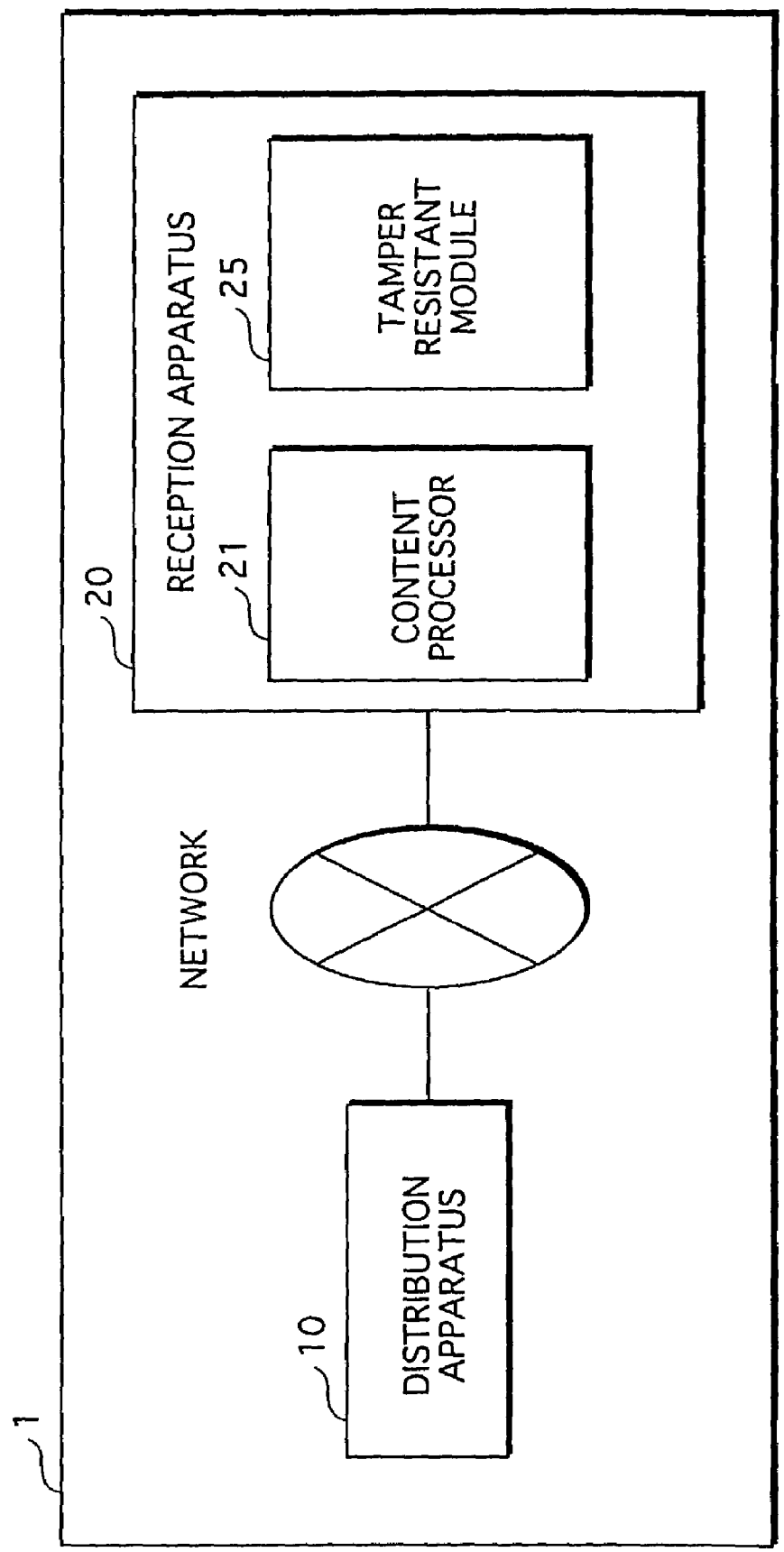
FIG. 1 is a block diagram showing the construction of a content distribution system according to a first embodiment of the present invention.

FIG. 1 is a block diagram showing the construction of a content distribution system 1.

A distribution apparatus 10 pre-stores contents and a usage expiry date-time of each content, and communicates with a reception apparatus 20 via a network.

The distribution apparatus 10 receives a content distribution request from the reception apparatus 20, and sends a requested content and expiry information that shows an adjusted usage expiry date-time of the content.

The reception apparatus 20 receives the expiry information, judges, based on the expiry information, whether playback of the content is permitted, and plays back the content on judging that playback of the content is permitted.

The reception apparatus 20 is composed of a content processor 21 and a tamper resistant module 25 that are electrically connected to each other via a bus. The tamper resistant module 25 performs the playback permission judgment, and the content processor 21 performs playback of the content according to the judgment.

1.1.1 Distribution Apparatus 10

Figure 2:
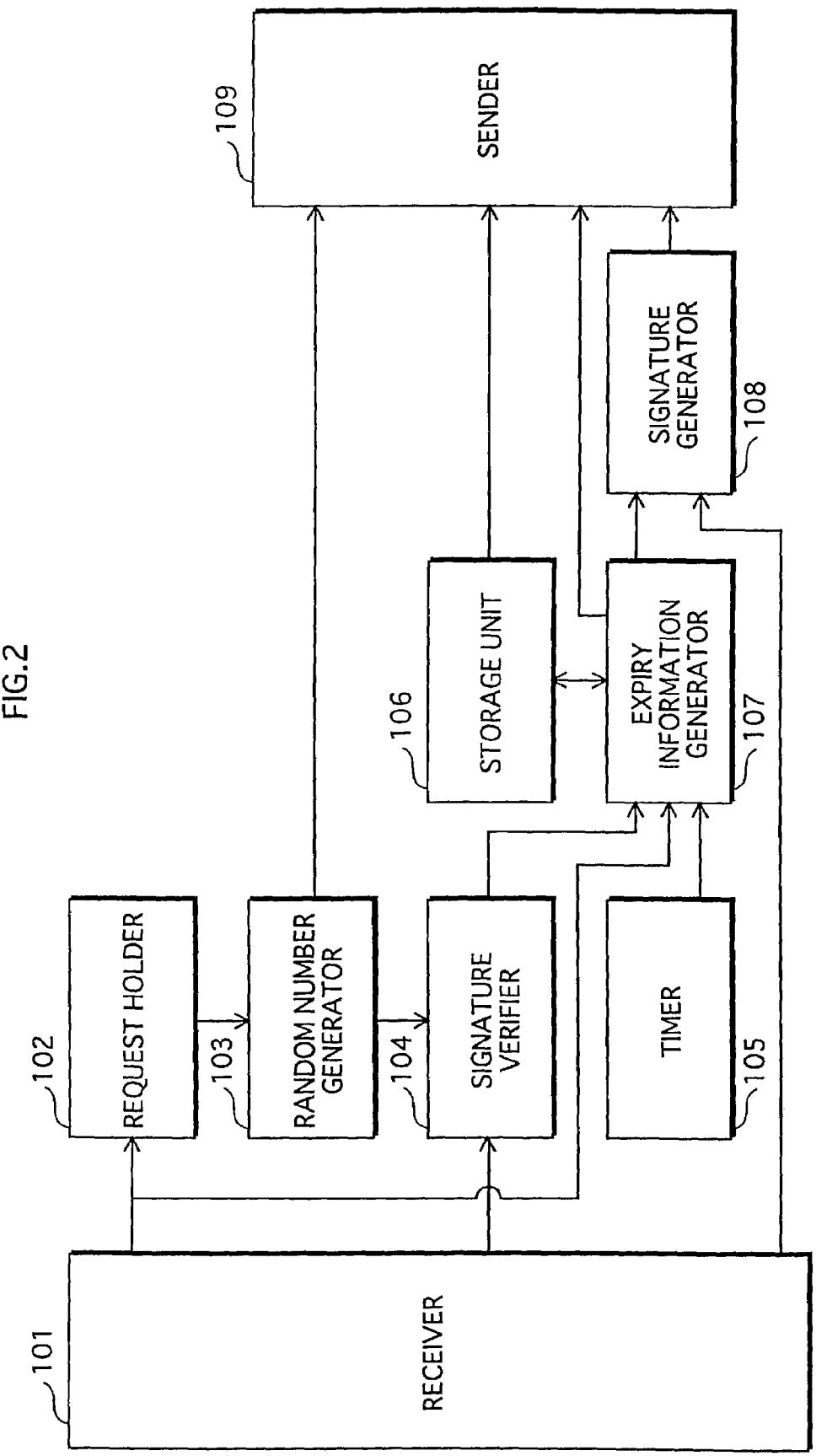
FIG. 2 is a block diagram showing the construction of a distribution apparatus shown in FIG. 1.

FIG. 2 is a block diagram showing the construction of the distribution apparatus 10.

The distribution apparatus 10, to be precise, is a computer system composed basically of a microprocessor, ROM, RAM, a hard disk, and a liquid crystal display unit. The RAM stores a computer program. The distribution apparatus 10 performs its function by the microprocessor operating according to the program.

Receiver 101

The receiver 101 receives various information items from the reception apparatus 20 via a network. The receiver 101 sends content designation information received from the reception apparatus 20 to a request holder 102 and to an expiry information generator 107.

The content designation information is information sent from the reception apparatus 20 to the distribution apparatus 10 to make a content distribution request, and shows a content requested to be distributed.

In addition, the receiver 101 sends to a signature verifier 104 a receiving-end date-time and a receiving-end signature both received from the reception apparatus 20.

The receiving-end date-time is generated by the reception apparatus 20, and used by the distribution apparatus 10 to adjust the usage expiry date-time of the requested content. The receiving-end signature is generated by the reception apparatus 20, and used by the distribution apparatus 10 to detect any tampering made to the receiving-end date-time.

The receiver 101 sends to a signature generator 108 a receiving-end random number received from the reception apparatus 20.

The receiving-end random number is information used to protect the expiry information and the receiving-end signature sent between the distribution apparatus 10 and the reception apparatus 20 against malicious replacement with expiry information and a digital signature sent from the distribution apparatus 10 but to a reception apparatus other than the reception apparatus 20.

Request Holder 102

The request holder 102 holds the content designation information received from the receiver 101. Upon receipt of the content designation information, in addition, the request holder 102 sends a random number generation request to a random number generator 103.

Random Number Generator 103

Upon receipt of the random number generation request from the request holder 102, the random number generator 103 generates a random number as a distributing-end random number, and then sends the generated distributing-end random number to a signature verifier 104 and a sender 109.

Signature Verifier 104

The signature verifier 104 verifies a signature received from the receiver 101. To this end, the signature verifier 104 pre-stores a receiving-end public key that is generated by the reception apparatus 20.

The signature verifier 104 receives the distributing-end random number from the random number generator 103, and stores the received distributing-end random number. In addition, the signature verifier 104 receives, from the receiver 101, the receiving-end date-time and the receiving-end signature.

Upon receipt of the receiving-end date-time and the receiving-end signature, the signature verifier 104 verifies the receiving-end signature with the use of the receiving-end public key in order to judge whether the receiving-end date-time is tampered.

Here, when the receiving-end signature is invalid, the signature verifier 104 judges that the receiving-end date-time has been tampered, and terminates the processing. On the other hand, when the receiving-end signature is valid, the signature verifier 104 judges that that the receiving-end date-time has not been tampered, and sends the receiving-end date-time to the expiry information generator 107.

Timer 105

A timer 105 counts up by one for every second, and the counting assumed to have been started on Jan. 1, 1970. Thus, for example, the value of the timer 105 is 1043385060 at the instant of 14:11:00 of Jan. 24, 2003. The value of timer 105 cannot be altered externally.

Storage Unit 106

A storage unit 106 pre-stores contents to be sent to the reception apparatus 20, and each content is associated with a content ID and a usage expiry date-time that are also stored in the storage unit 106. Here, each usage expiry date-time is expressed in seconds counted from the Jan. 1, 1970.

Expiry Information Generator 107

The expiry information generator 107 adjusts the usage expiry date-time of a requested content.

To be more specific, upon receipt of the receiving-end date-time from the signature verifier 104, the expiry information generator 107 acquires a distributing-end date-time that is clocked by the timer 105 at that instant. The expiry information generator 107 then reads, from the storage unit 106, a usage expiry date-time of a content identified by a content ID that matches the content designation information received from the receiver 101. Finally, the expiry information generator 107 calculates the difference between the receiving-end date-time and the distributing-end date-time, and adds the difference to the read usage expiry date-time to obtain the expiry information of the requested content.

For example, when the value of receiving-end date-time is 1043384880 that represents 14:08:00 of Jan. 24, 2003, and the value of distributing-end date-time is 1043385060 that represents 14:11:00 of Jan. 24, 2003, the difference is −180 (=1043384880−1043385060).

Here, when the value of read usage expiry date-time is 104338500 that represents 14:10:00 of Jan. 24, 2003, the expiry information takes a value of 1043384320 (=104338500+(−180)).

The expiry information generator 107 sends the content designation information and the expiry information to the signature generator 108. In addition, the expiry information generator 107 instructs the sender 109 to send the content ID that matches the content designation information, and the content that is identified by that content ID.

Signature Generator 108

The signature generator 108 generates a digital signature.

To this end, the signature generator 108 generates in advance a distributing-end public key and a corresponding distributing-end secret key for use in digital signature generation and verification, respectively. The distributing-end public key is given to the reception apparatus 20 in advance.

The signature generator 108 concatenates (i) the content designation information and (ii) the expiry information both received from the expiry information generator 107, and (iii) the receiving-end random number received from the receiver 101, and generates a digital signature from the concatenated data using the distributing-end secret key, thereby obtaining the distributing-end digital signature.

The signature generator 108 instructs the sender 109 to send the expiry information and the distributing-end signature to the reception apparatus 20.

Sender 109

The sender 109 sends various information items to the reception apparatus 20 according to the instructions from the random number generator 103, the expiry information generator 107, and the signature generator 108.

To be more specific, the sender 109 sends the requested content and the corresponding content ID to the reception apparatus 20 according to the instructions from the expiry information generator 107. In addition, the sender 109 sends, to the reception apparatus 20, the distributing-end random number according to the instructions from the random number generator 103, and the expiry information and the distributing-end signature according to the instructions from the signature generator 108.

1.1.2 Content Processor 21

Figure 3:
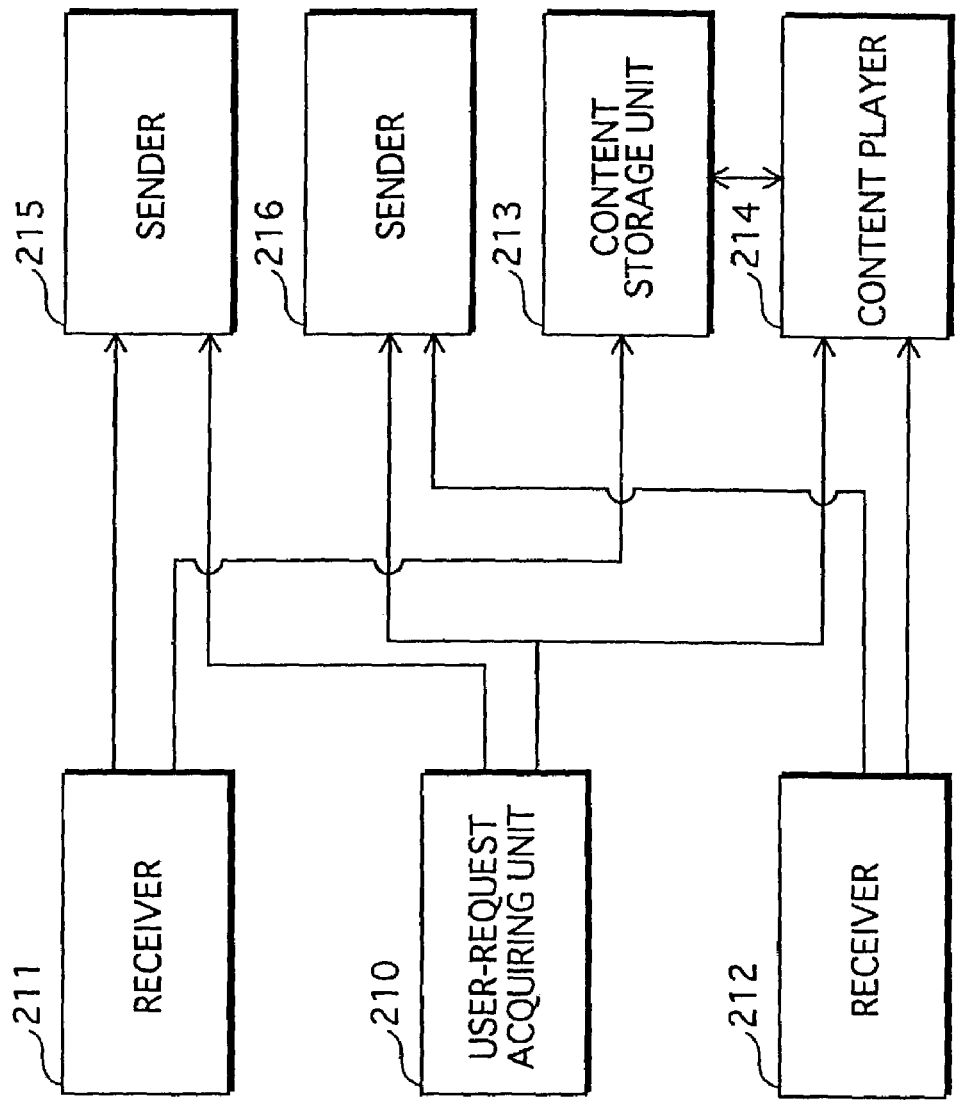
FIG. 3 is a block diagram showing the construction of a content processor shown in FIG. 1.

FIG. 3 is a block diagram showing the construction of the content processor 21.

The content processor 21, to be precise, is a computer system composed basically of a microprocessor, ROM, RAM, a hard disk, a liquid crystal display unit, and a remote controller. The RAM stores a computer program. The content processor 21 performs its function by the microprocessor operating according to the program.

User-Request Acquiring Unit 210

In response to a request entered by a user with the remote controller (not illustrated) for playback of a content, a user-request acquiring unit 210 acquires content designation information designating the requested content. The user-request acquiring unit 210 then sends the acquired content designation information to a content player 214 and a sender 216.

Receiver 211

A receiver 211 receives various information items from the distribution apparatus 10 via the network.

The receiver 211 then sends, to a sender 215, the distributing-end random number, the expiry information, and the distributing-end signature all received from the distribution apparatus 10. In addition, the receiver 211 receives the requested content and the corresponding content ID, and stores, in a content storage unit 213, the received content and content ID in association with each other.

Receiver 212

The receiver 212 receives various information items from the tamper resistant module 25 that is electrically connected thereto via the bus.

The receiver 212 sends to the sender 216 the receiving-end date-time, the receiving-end signature, and the distributing-end random number all received from the tamper resistant module 25. In addition, the receiver 212 sends, to the content player 214, playback permission information that is received from the tamper resistant module 25 for the requested content. The playback permission information shows whether playback of the content is permitted.

Content Storage Unit 213

The content storage unit 213 stores, in association with each other, the content and the corresponding content ID both received from the receiver 211.

Content Player 214

The content player 214 controls playback operations of the content according to playback permission information that is received from the receiver 212 for that content.

To be more specific, when the playback information shows permission, the content player 214 reads, from the content storage unit 213, a content that is identified by the content ID matching the content designation information received from the user-request acquiring unit 210, and plays back the read content. When the playback permission information shows prohibition, on the other hand, the content player 214 terminates playback operations of the content that is identified by the content ID matching the designation information received from the user-request acquiring unit 210, if such operations are being performed.

Sender 215

According to the instructions from the user-request acquiring unit 210 and the receiver 211, the sender 215 sends various information items, to the tamper resistant module 25 via the bus.

To be more specific, the sender 215 sends to the tamper resistant module 25 a user date-time received from the user-request acquiring unit 210, the distributing-end random number, the expiry information, and the distributing-end signature each received from the receiver 211.

Sender 216

According to the instructions from the user-request acquiring unit 210 and the receiver 212, the sender 216 sends various information items to the distribution apparatus 10 via the network.

To be more specific, the sender 216 sends, to the distribution apparatus 10, the content designation information received from the user-request acquiring unit 210, the receiving-end date-time, the receiving-end signature, and the distributing-end random number each received from the receiver 212.

1.1.3 Tamper Resistant Module 25

In terms of hardware, the tamper resistant module 25 is composed basically of a CPU, ROM, and RAM. The ROM stores a computer program, and the tamper resistant module 25 performs its function by the CPU operating according to the program.

The tamper resistant module 25 is provided with protection against direct access from an external source to data stored in the ROM and RAM. Details of a tamper resistant module are disclosed, for example, in the JP Unexamined Patent Application Publication No. 2000-164810.

Figure 4:
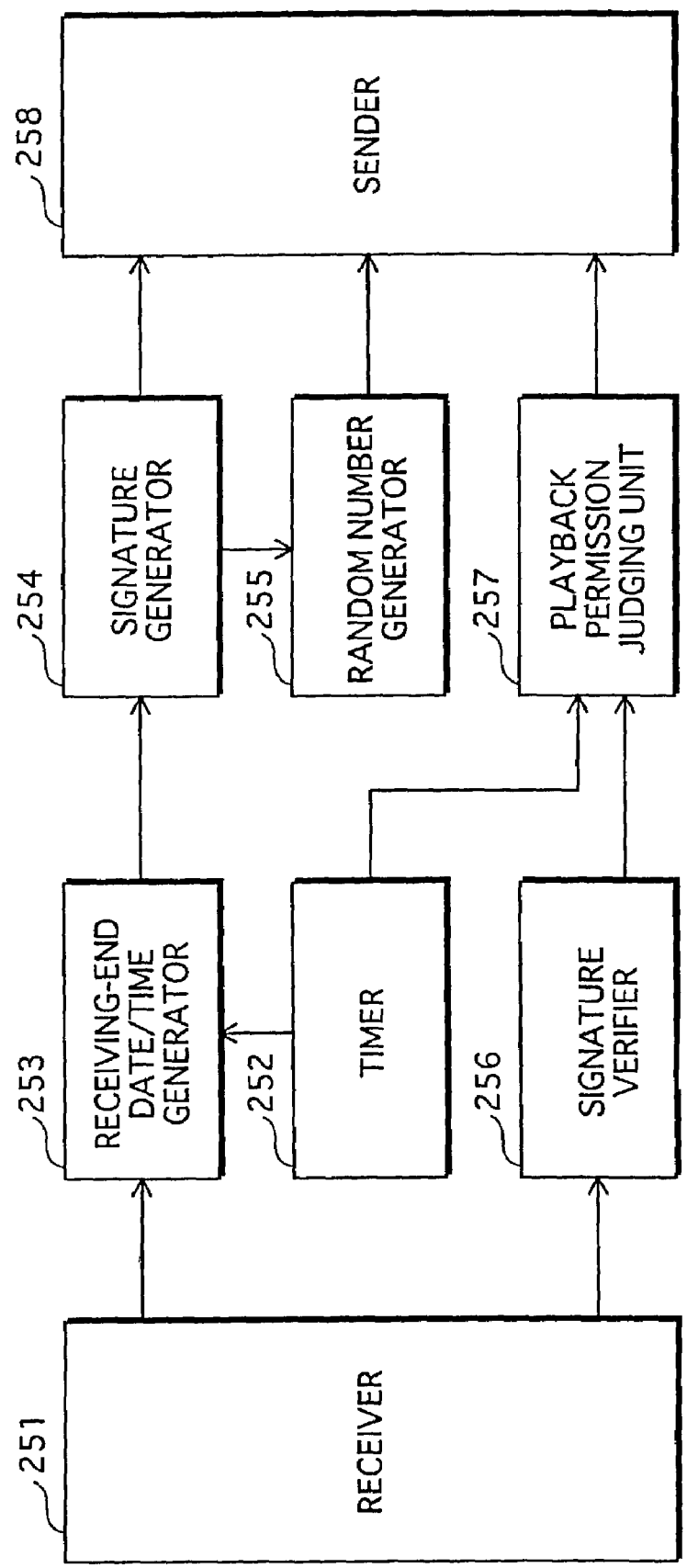
FIG. 4 is a block diagram showing the construction of a tamper resistant module shown in FIG. 1.

FIG. 4 is a block diagram showing the construction of the tamper resistant module 25.

Receiver 251

The receiver 251 receives various information items from the content processor 21 that is electrically connected thereto via the bus.

The receiver 251 sends, to a receiving-end date-time generator 253, the distributing-end random number received from the content processor 21. In addition, the receiver 251 sends, to a signature verifier 256, the expiry information and the distributing-end signature each received from the content processor 21.

Timer 252

A timer 252 counts up by one for every second, and the counting assumed to have been started on Jan. 1, 1970.

Receiving-End Date-Time Generator 253

The receiving-end date-time generator 253 receives the distributing-end random number from the receiver 251. The receiving-end date-time generator 253 then sends, to a signature generator 254, the distributing-end random number and a receiving-end date-time that is clocked by the timer 252 at that instant when the distributing-end random number is received.

Signature Generator 254

The signature generator 254 generates a digital signature. To this end, the signature generator 254, in advance, generates and stores the receiving-end public key and the corresponding receiving-end secret key mentioned above. The receiving-end public key is given to the distribution apparatus 10 in advance.

The signature generator 254 first concatenates the receiving-end date-time and distributing-end random number both received from the receiving-end date-time generator 253, and generates a digital signature from the concatenated data, thereby obtaining the receiving-end signature. The signature generator 254 then sends the receiving-end date-time and the receiving-end signature to a sender 258.

After generating the receiving-end signature, the signature generator 254 sends a random number generation request to a random number generator 255.

Random Number Generator 255

The random number generator 255 generates, upon receipt of a random number generation request from the signature generator 254, a random number as a receiving-end random number, and then sends the generated receiving-end random number to the sender 258.

Signature Verifier 256

The signature verifier 256 verifies a received distributing-end signature. To this end, the signature verifier 256 pre-stores the distributing-end public key generated by the distribution apparatus 10.

The signature verifier 256 receives the expiry information and the distributing-end signature from the receiver 251, and verifies the distributing-end signature with the use of the distributing-end public key in order to judge whether the expiry information has been tampered.

When the distributing-end signature is invalid, the signature verifier 256 judges that the expiry information has been tampered, and terminates the processing. When the distributing-end signature is valid, on the other hand, the signature verifier 256 judges that the expiry information has not been tampered, and sends the expiry information to a playback permission judging unit 257.

Playback Permission Judging Unit 257

The playback permission judging unit 257 acquires a judgment date-time that is a date-time clocked by the timer 252 at the instant when the expiry information is received.

The playback permission judging unit 257 judges that playback of the content is permitted in the case where the judgment date-time is equal to or prior to the date-time shown by the expiry information, while judging that playback of the content is prohibited when the judgment date-time is after the date-time shown by the expiry information.

The playback permission judging unit 257 then instructs the sender 258 to send the judgment result as playback permission information to the content processor 21.

Sender 258

The sender 258 sends, to the content processor 21, various information items received from the signature generator 254, the random number generator 255, and the playback permission judging unit 257.

To be more specific, the sender 258 sends, to the content processor 21, the receiving-end date-time and the receiving-end signature both received from the signature generator 254, the receiving-end random number received from the random number generator 255, and the playback permission information received from the playback permission judging unit 257.

1.2 Operations

Now, description is given to operations of the content distribution system consistent with the first embodiment with reference to the drawings.

Figure 5:
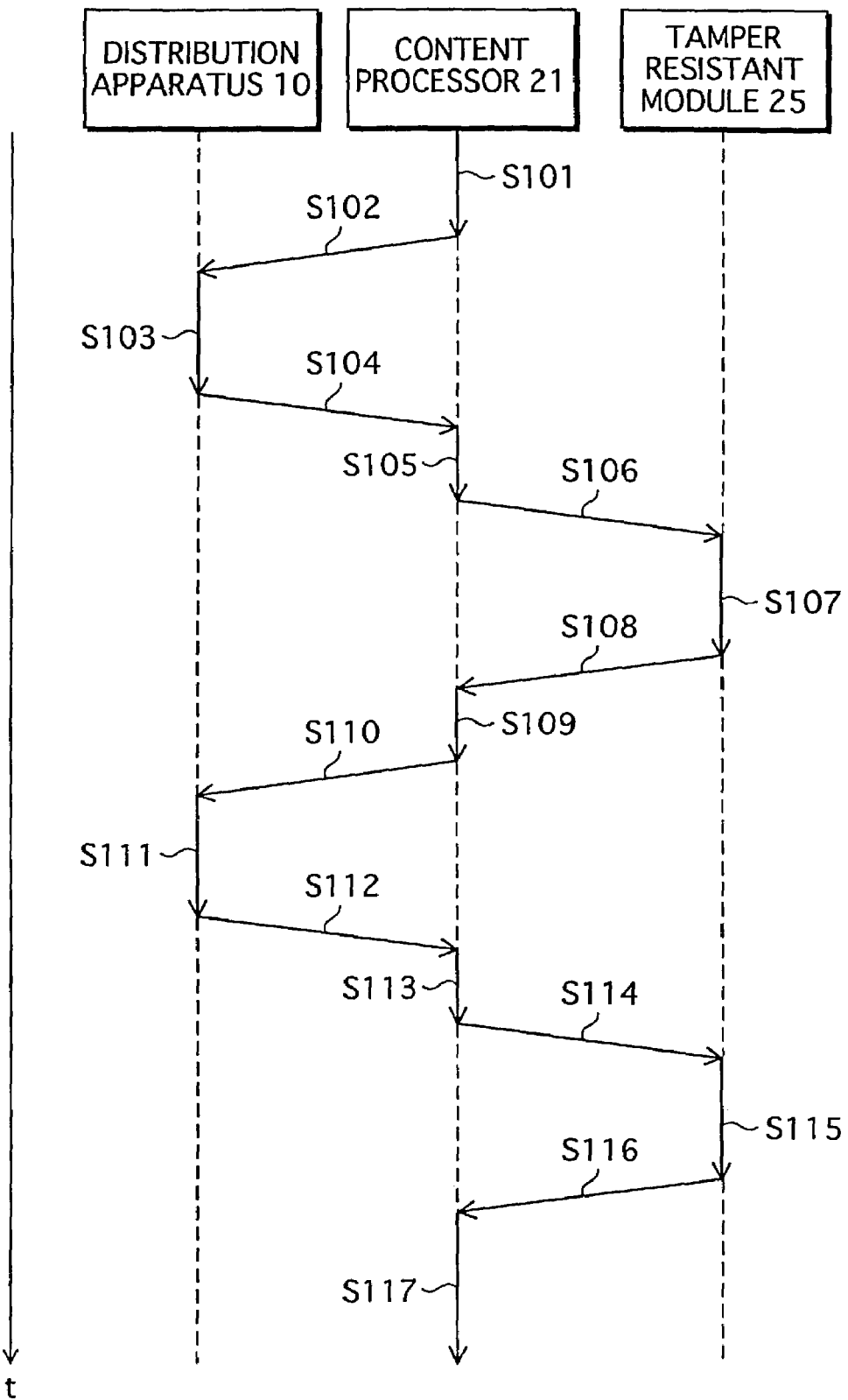
FIG. 5 is a view showing the process flow of content distribution operations performed by the content distribution system according to the first embodiment of the present invention.

FIG. 5 is a view showing the process flow of the content distribution operations performed by the content distribution system 1.

Here, the distribution apparatus 10 stores a first content of which content ID is "1", and a user of the reception apparatus 20 requests the first content for playback. The usage expiry date-time of the first content is Jan. 24, 2003, which is represented by the value 1043385600.

For requesting playback of the first content, the user of the reception apparatus 20 inputs, with the use of the remote controller, the content ID which in this case is a value "1" as content designation information (step S101).

In response, the content processor 21 receives the content designation information. The content processor 21 then sends the content designation information to the distribution apparatus 10 (step S102).

Upon receipt of the content designation information, the distribution apparatus 10 stores a value "1" shown by the received content designation information, and generates a distributing-end random number (step S103).

Next, the distribution apparatus 10 sends the thus generated distributing-end random number to the content processor 21 (step S104).

The content processor 21 receives the distributing-end random number (step S105).

The content processor 21 sends the received distributing-end random number to the tamper resistant module 25 (step S106).

Upon receipt of the distributing-end random number, the tamper resistant module 25 generates a receiving-end date-time, and generates, as a distributing-end signature, a digital signature from the receiving-end date-time and the distributing-end random number (step S107).

The receiving-end date-time generated herein has a value 1043384880 representing 14:08:00 of Jan. 24, 2003.

In addition, the tamper resistant module 25 generates a receiving-end random number. Then, the tamper resistant module 25 sends the receiving-end date-time, the receiving-end signature, and the receiving-end random number to the content processor 21 (step S108).

The content processor 21 receives the receiving-end date-time, the receiving-end signature, and the receiving-end random number (step S109).

The content processor 21 then sends, to the distribution apparatus 10, the receiving-end date-time, the receiving-end signature, and the receiving-end random number (step S110).

Upon receipt of the receiving-end date-time, the receiving-end signature, and the receiving-end random number, the distribution apparatus 10 verifies the receiving-end signature (step S111).

When judging through the signature verification that the receiving-end date-time has not been tampered, the distribution apparatus 10 adjusts the usage expiry date-time of the first content based on the difference between the date-time clocked by the timer 252 included in the reception apparatus 20 and the date-time clocked by the timer 105 included in the distribution apparatus 10.

Suppose, for example, the date-time clocked by the timer 105 at the instant of the receiving-end date-time reception has a value 1043385060, which represents 14:11:00 of Jan. 24, 2003. The expiry information is obtained by the following expression: the expiry information=the usage expiry date-time of the first content+(the receiving-end date-time−the distributing-end date-time), which in this example is substituted by the following values: 1043385600+(1043384880−1043385060)=1043385420.

The distribution apparatus 10 concatenates the thus obtained expiry information and the receiving-end random number, and generates a digital signature, as a distributing-end digital signature, from the concatenated data.

The distribution apparatus 10 then sends the distributing-end digital signature and the expiry information to the content processor 21 (step S112).

The content processor 21 receives the distributing-end digital signature and the expiry information (step S113).

Then, the content processor 21 sends the distributing-end digital signature and the expiry information to the tamper resistant module 25 (step S114).

The tamper resistant module 25 receives the distributing-end digital signature and the expiry information (step S115), and verifies the distributing-end digital signature to judge whether the expiry information has been tampered.

When judging that the expiry information has not been tampered, the tamper resistant module 25 compares the expiry information with the date-time clocked by the timer 252 at the instant when the expiry information is received.

For example, in the case where the date-time clocked by the timer 252 at the instant of expiry information reception is 14:08:00 of Jan. 24, 2003 represented by 1043384880, the value of the expiry information 1043385420 is greater. Consequently, it is judged that playback of the first content is permitted.

On the other hand, in the case where the date-time clocked by the timer 252 at the instant of expiry information reception is 14:18:00 of Jan. 24, 2003 represented by 1043385680, the value of the expiry information 1043385420 is smaller. Consequently, it is judged that playback of the first content is prohibited.

The tamper resistant module 25 sends to the content processor 21, playback permission information showing, according to the judgment, whether playback of the content is permitted (step S116).

The content processor 21 receives the playback permission information (step S117). When the playback permission information shows permission, the content processor 21 plays back the first content. On the other hand, when the playback permission information shows prohibition, the content processor 21 terminates playback operations of the first content.

Second Embodiment 2.1 Construction

Figure 6:
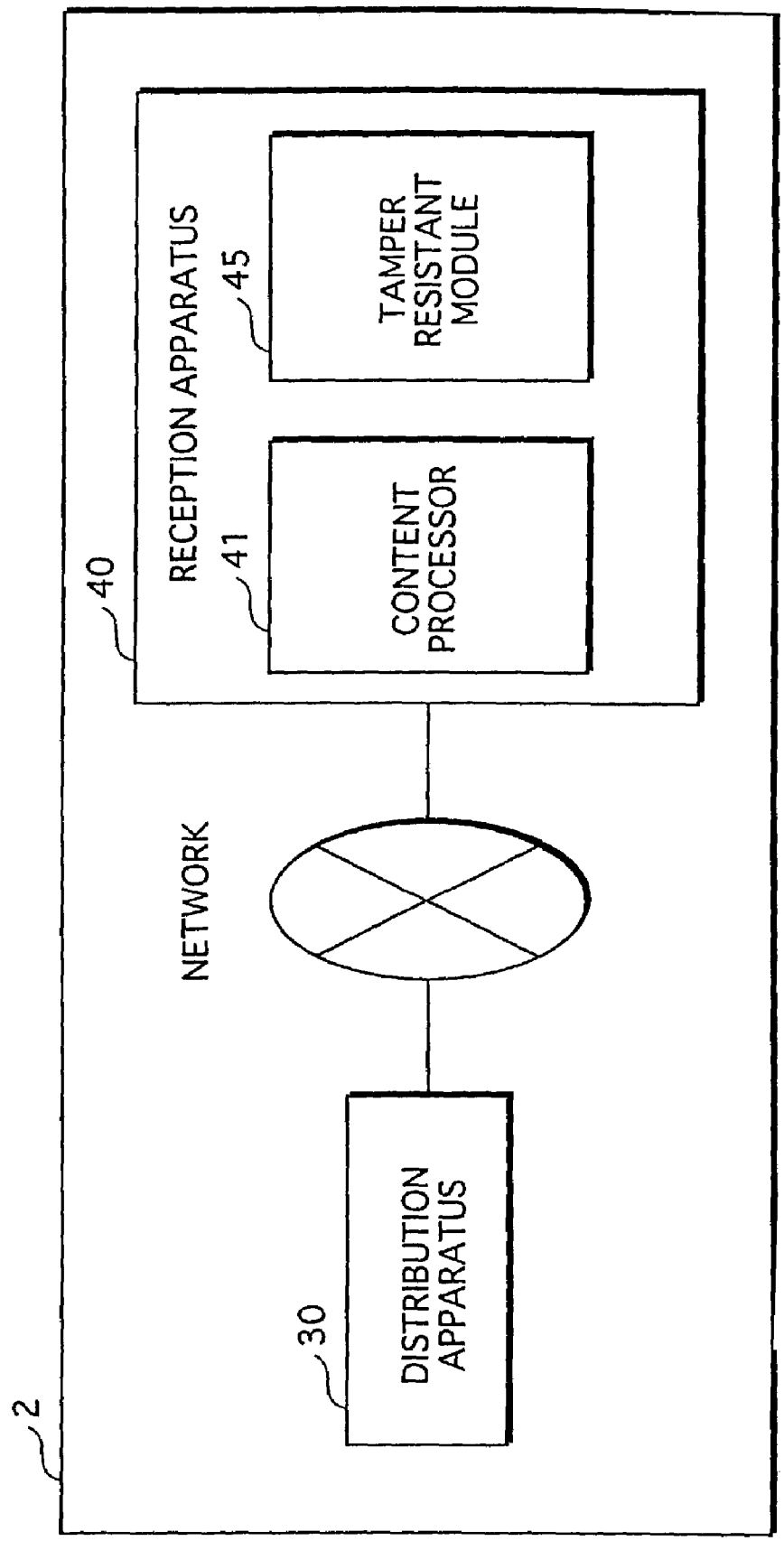
FIG. 6 is a block diagram showing the construction of a distribution system according to a second embodiment of the present invention.

FIG. 6 is a block diagram showing the construction of a content distribution system 2.

A distribution apparatus 30 pre-stores contents and a usage expiry date-time of each content, and communicates with a reception apparatus 40 via a network.

The distribution apparatus 30 receives a content distribution request from the reception apparatus 40, and sends a requested content and expiry information that shows an adjusted usage expiry date-time of the content.

The reception apparatus 40 receives the expiry information, judges, based on the expiry information, whether playback of the content is permitted, and plays back the content on judging that playback of the content is permitted.

The reception apparatus 40 is composed of a content processor 41 and a tamper resistant module 45 that are electrically connected to each other via a bus. The tamper resistant module 45 makes the playback permission judgment and the content processor 41 performs the playback of content according to the judgment.

The reception apparatus 40 additionally includes an internal timer, and shows a date-time to a user of the reception apparatus 40.

When requesting the date-time displayed by the reception apparatus 40 to be altered, the user inputs a user date-time using the remote controller (not illustrated).

Upon receipt of the user date-time, the reception apparatus 40 stores a difference between the user date-time and the date-time clocked by the timer at the instant when the user date-time is received, rather than directly replacing the date-time clocked by the timer with the received user date-time.

Once the difference described above is stored, the reception apparatus 40 displays, upon a receipt of a request for date-time display, a date-time obtained by adding the difference to the date-time clocked by the timer at the instant when the request is received.

2.1.1 Distribution Apparatus 30

Figure 7:
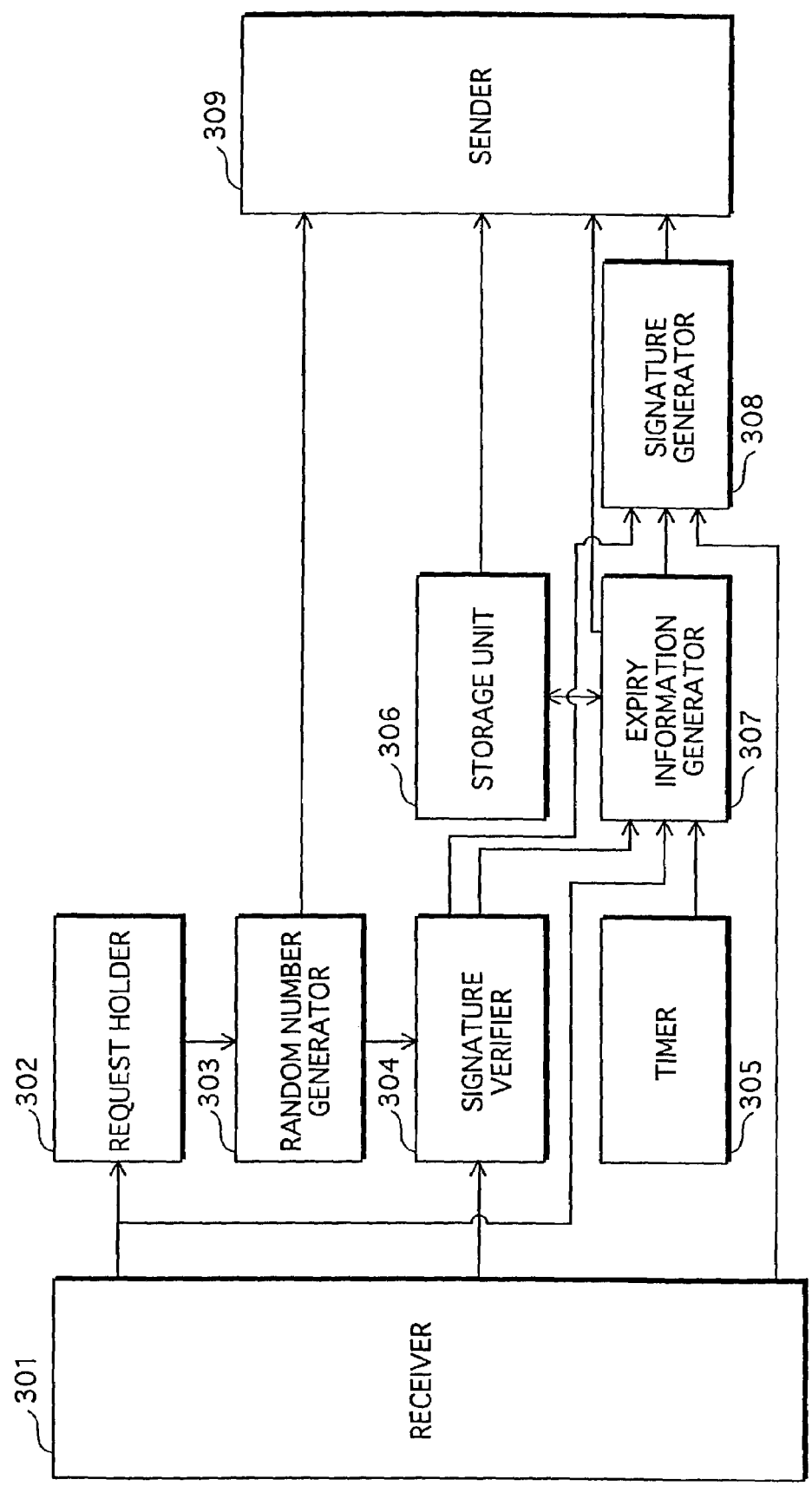
FIG. 7 is a block diagram showing the construction of a distribution apparatus shown in FIG. 6.

FIG. 7 is a block diagram showing the construction of the distribution apparatus 30.

The distribution apparatus 30, to be precise, is a computer system composed basically of a microprocessor, ROM, RAM, a hard disk, and a liquid crystal display unit. The RAM stores a computer program. The distribution apparatus 30 performs its function by the microprocessor operating according to the program.

Receiver 301

A receiver 301 receives various information items from the reception apparatus 40 via the network.

The receiver 301 then sends content designation information received from the reception apparatus 40 to a request holder 302 and to an expiry information generator 307.

The content designation information is information sent from the reception apparatus 40 to the distribution apparatus 30 upon making a content distribution request, and shows a content to be distributed.

In addition, the receiver 301 sends, to a signature verifier 304, a receiving-end date-time, difference designation information, and a receiving-end signature each received from the reception apparatus 40.

The receiving-end date-time is a date-time generated by the reception apparatus 40, and is for use by the distribution apparatus 30 to adjust the expiry of the requested content.

The difference designation information is an identifier for use by the reception apparatus 40 to perform internal information processing. The receiving-end signature is generated by the reception apparatus 40, and is for use by the distribution apparatus 30 to detect tampering made to the receiving-end date-time and the difference designation information.

In addition, the receiver 301 sends a receiving-end random number received from the reception apparatus 40 to a signature generator 308.

The receiving-end random number is information provided for protecting the expiry information and the receiving-end signature that are sent between the distribution apparatus 30 and the reception apparatus 40 against such tampering that they are replaced with expiry information and a receiving-end signature that are sent from the distribution apparatus 30 to a reception apparatus other than the reception apparatus 40.

Request Holder 302

The request holder 302 holds the content designation information received from the receiver 301. Upon receipt of the content designation information, the request holder 302 sends a random number generation request to a random number generator 303.

Random Number Generator 303

The random number generator 303 generates, upon receipt of the random number request from the request holder 302, a random number as a distributing-end random number, and sends the generated distributing-end random number to the signature verifier 304 and a sender 309.

Signature Verifier 304

The signature verifier 304 verifies the signature received from the receiver 301. To this end, the signature verifier 304 pre-stores a receiving-end public key that is generated by the reception apparatus 40.

The signature verifier 304 receives the distributing-end random number from the random number generator 303, and stores the received distributing-end random number. Further, the signature verifier 304 receives, from the receiver 301, the receiving-end date-time, the difference designation information, the receiving-end signature.

The signature verifier 304 verifies the receiving-end signature with the use of the receiving-end public key in order to detect any tampering made to the receiving-end date-time and/or the difference designation information.

When the receiving-end signature is invalid, the signature verifier 304 judges that the receiving-end date-time and/or the difference designation information has been tampered, and terminates the processing. On the other hand, when the receiving-end signature is valid, the signature verifier 304 judges that the receiving-end date-time and the difference designation information has not been tampered, and sends the receiving-end date-time and the difference designation information to the expiry information generator 307 and the signature generator 308, respectively.

Timer 305

A timer 305 counts up by one for every second, and the counting assumed to have been started on Jan. 1, 1970. Thus, for example, the value of the timer 305 is 1043385060 at the instant of 14:11:00 on Jan. 24, 2003.

Storage Unit 306

A storage unit 306 pre-stores contents to be sent to the reception apparatus 40, and each content is associated with a content ID and a usage expiry date-time that are also stored in the storage unit 306. Similarly to the first embodiment, each usage expiry date-time is expressed in seconds counted from Jan. 1, 1970.

Expiry Information Generator 307

The expiry information generator 307 adjusts the usage expiry date-time of the designated content.

To be more specific, upon receipt of the receiving-end date-time from the signature verifier 304, the expiry information generator 307 acquires a distributing date-time that is a date-time clocked by the timer 305 at that instant. The expiry information generator 307 then reads, from the storage unit 306, a usage expiry date-time of the content that corresponds to a content ID matching the content designation information received from the receiver 301. Finally, the expiry information generator 307 calculates a difference between the receiving-end date-time and the distributing-end date-time, and adds the difference to the read usage expiry date-time to obtain the expiry information of the designated content.

For example, when the receiving-end date-time is 1043384880 that represents 14:08:00 of Jan. 24, 3003, and the distributing-end date-time is 1043385060 that represents 14:11:00 of Jan. 24, 2003, the difference is −180 (=1043384880−1043385060).

Here, when the read usage expiry date-time is 104338500 that represents 14:10:00 of Jan. 24, 2003, the expiry information takes a value of 1043384320 (=104338500+(−180)).

The expiry information generator 307 sends the content designation information and the expiry information to the signature generator 308. In addition, the expiry information generator 307 instructs the sender 309 to send the content ID that matches the content designation information, and the content that is identified by that content ID.

Signature Generator 308

The signature generator 308 generates a digital signature.

The signature generator 308 generates in advance a distributing-end public key and a corresponding distributing-end secret key for use in digital signature generation and verification, respectively. The distributing-end public key is given in advance to the reception apparatus 40.

The signature generator 308 concatenates (i) the content designation information and (ii) the expiry information, which are both received from the expiry information generator 307, (iii) the difference designation information received from the signature verifier 304, and (iv) the receiving-end random number received from the receiver 301. The signature generator 308 then generates, as a distributing-end digital signature, a digital signature from the concatenated data with the use of the distributing-end secret key.

The signature generator 308 instructs the sender 309 to send the expiry information, the difference designation information, and the distributing-end signature to the reception apparatus 40.

Sender 309

The sender 309 sends various information items to the reception apparatus 40 in response to the instructions from the random number generator 303, the expiry information generator 307, and the signature generator 308.

To be more specific, the sender 309 sends the designated content and the corresponding content ID to the reception apparatus 40 in accordance with the instructions from the expiry information generator 307. In addition, the sender 309 sends, to the reception apparatus 40, the distributing-end random number in accordance with the instructions from the random number generator 303. Further, the sender 309 sends, to the reception apparatus 40, the expiry information, the difference designation information, and the distributing-end signature in accordance with the instructions from the signature generator 308.

2.1.2 Content Processor 41

Figure 8:
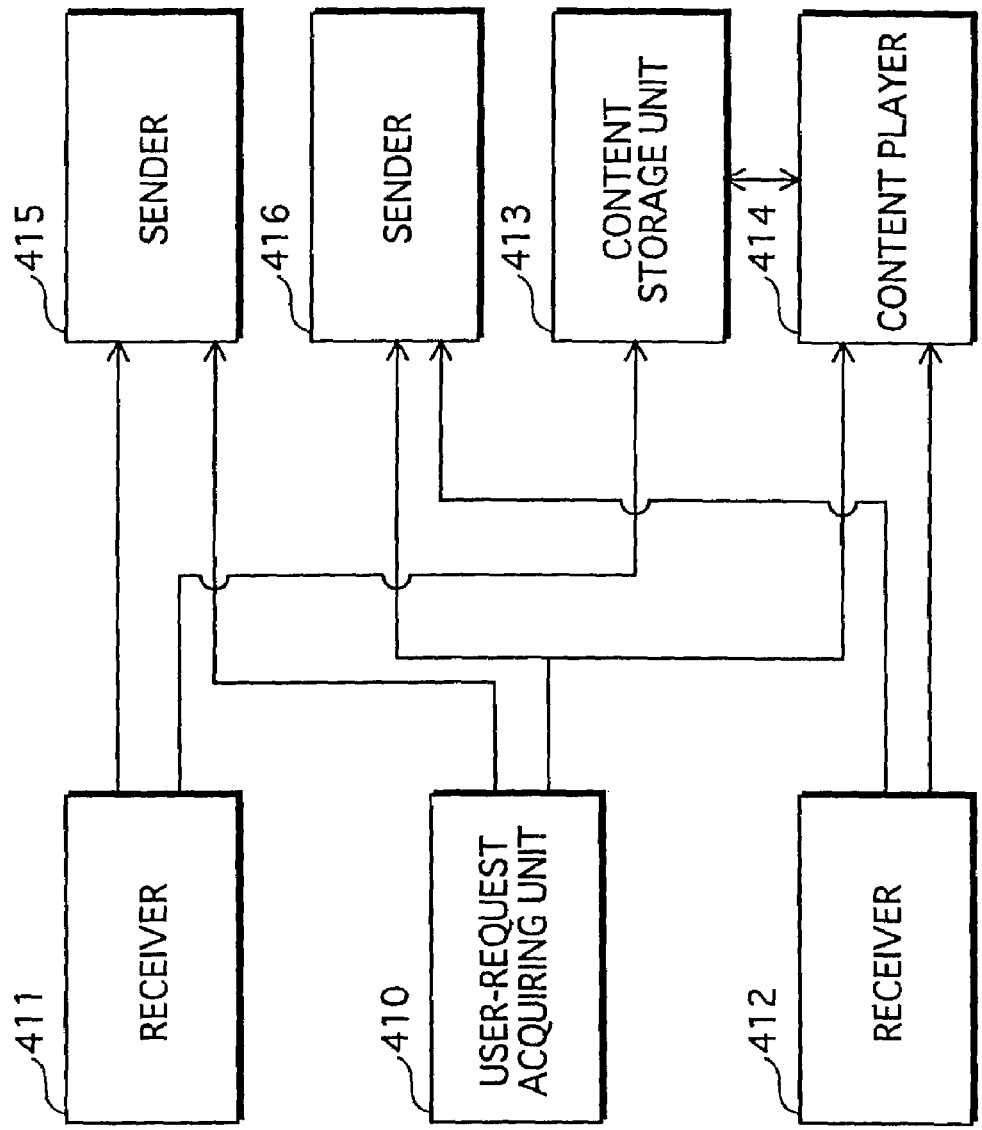
FIG. 8 is a block diagram showing the construction of a content processor shown in FIG. 6.

FIG. 8 is a block diagram showing the construction of the content processor 41.

The content processor 41, to be precise, is a computer system composed basically of a microprocessor, ROM, RAM, a hard disk, a liquid crystal display unit, and a remote controller. The RAM stores a computer program. The content processor 41 performs its function by the microprocessor operating according to the program.

User-Request Acquiring Unit 410

A user-request acquiring unit 410 acquires a user date-time and content designation information both designated by a user with the use of the remote controller (not illustrated). The content designation information designates a content that the user requests for playback. The user-request acquiring unit 410 then sends the acquired user date-time to a sender 415, and the acquired content designation information to a content player 414 and a sender 416.

Receiver 411

A receiver 411 receives various information items from the distribution apparatus 30 via the network.

The receiver 411 then sends, to the sender 415, the distributing-end random number, the expiry information, the difference designation information, and the distributing-end signature all received from the distribution apparatus 30. In addition, the receiver 411 receives the designated content and the corresponding content ID, and stores, in a content storage unit 413, the received content and content ID in association with each other.

Receiver 412

The receiver 412 receives various information items from the tamper resistant module 45 that is electrically connected thereto via the bus.

The receiver 412 then sends, to the sender 416, the receiving-end date-time, the difference designation information, the receiving-end signature, and the distributing-end random number all received from the tamper resistant module 45. In addition, the receiver 412 sends, to the content player 414, playback permission information received from the tamper resistant module 45. The playback permission information shows whether playback of the content is permitted.

Content Storage Unit 413

The content storage unit 413 stores the content in association with the corresponding content ID both received from the receiver 411.

Content Player 414

The content player 414 controls playback operations of the content according to the playback permission information that is received from the reviver 412 for that content.

To be more specific, when the playback permission information shows permission, the content player 414 reads from the content storage unit 413 the content that is identified by the content ID matching the content designation information received from the user-request acquiring unit 410, and plays back the read content. When the playback permission information shows prohibition, on the other hand, the content player 414 terminates playback operations of the content that is identified by the content ID matching the designation information received from the user-request acquiring unit 410, if such operations are being performed.

Sender 415

Upon receipt of the instructions from the user-request acquiring unit 410 and the receiver 411, the sender 415 sends various information items to the tamper resistant module 45 via the bus.

To be more specific, the sender 415 sends, to the tamper resistant module 45, the user date-time received from the user-request acquiring unit 410, the distributing-end random number, the expiry information, the difference designation information, and the distributing-end signature each received from the receiver 411.

Sender 416

In response to the instructions received from the user-request acquiring unit 410 and the receiver 412, the sender 416 sends various information items to the distribution apparatus 30 via the network.

To be more specific, the sender 416 sends, to the distribution apparatus 30, the content designation information received from the user-request acquiring unit 410, the receiving-end date-time, the difference designation information, the receiving-end signature, and the distributing-end random number each received from the receiver 412.

2.1.3 Tamper Resistant Module 45

In terms of hardware, the tamper resistant module 45 is composed basically of a CPU, ROM, and RAM. The ROM stores a computer program, and the tamper resistant module 45 performs its function by the CPU operating according to the program.

The tamper resistant module 45 is provided with protection against direct access from an external source to the date stored in the ROM and RAM.

Figure 9:
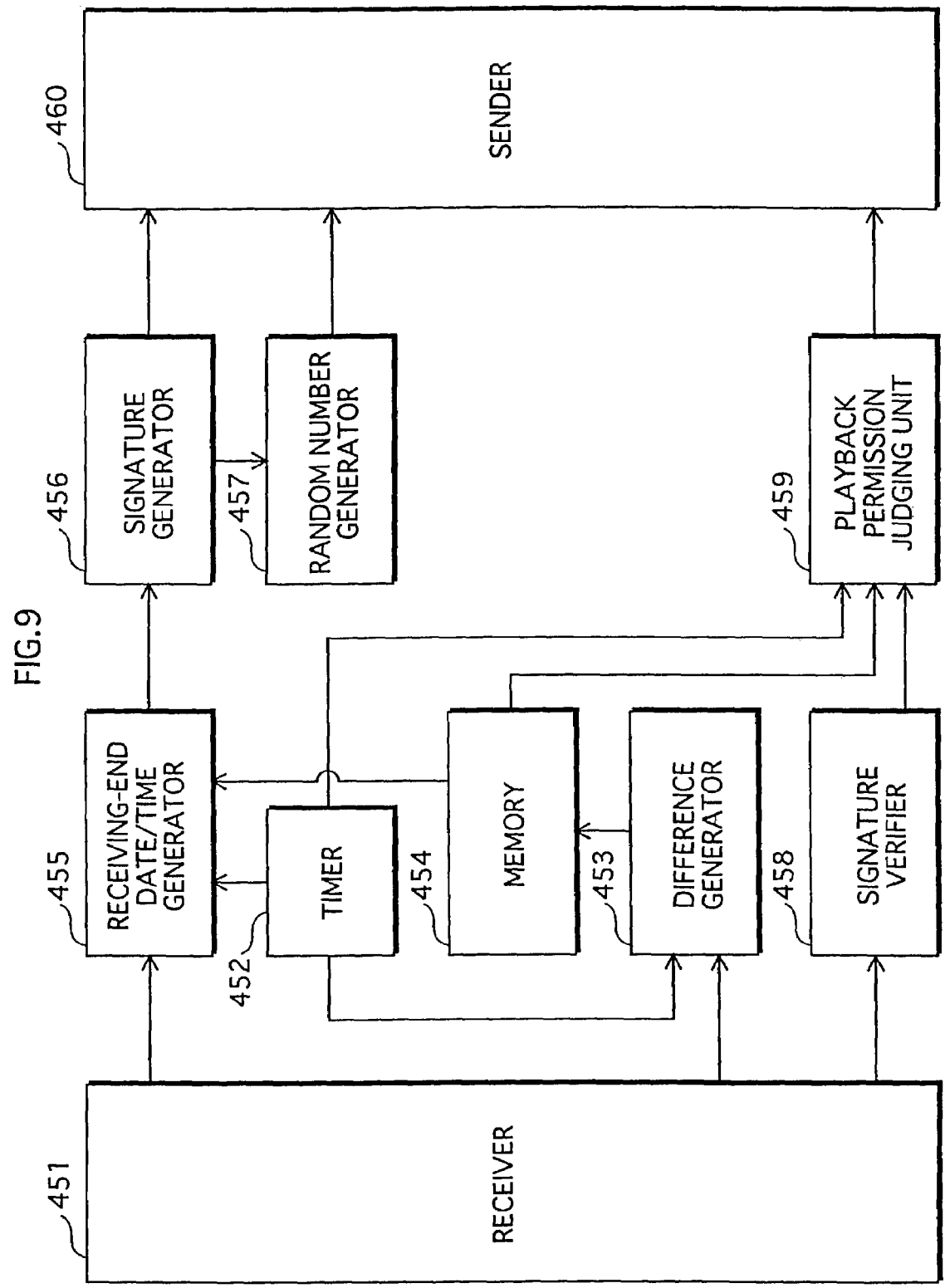
FIG. 9 is a block diagram showing the construction of a tamper resistant module shown in FIG. 6.

FIG. 9 is a block diagram showing the construction of the tamper resistant module 45.

Receiver 451

A receiver 451 receives various information items from the content processor 41 that is electrically connected thereto via the bus.

The receiver 451 sends, to a difference generator 453, the user date-time received from the content processor 41. In addition, the receiver 451 sends, to a receiving-end date-time generator 455, the distributing-end random number received from the content processor 41. In addition, the receiver 451 sends, to a signature verifier 458, the expiry information, the difference designation information, and the distributing-end signature all received from the content processor 41.

Timer 452

A timer 452 counts up by one for every second, and the counting assumed to have been started on Jan. 1, 1970.

Difference Generator 453

The difference generator 453 receives the user date-time from the receiver 451.

Upon receipt of the user date-time, the difference generator 453 calculates a date-time difference between the user date-time and a date-time clocked by the timer 452 at that instant. In addition, the difference generator 453 generates a difference ID that identifies the thus calculated date-time difference, and stores, into a memory 454, the calculated date-time difference and the difference ID in association with each other.

Memory 454

The memory 454 stores date-time differences and difference IDs in association with each other. Additionally, the memory 454 stores a most-recently stored difference ID as current difference information.

Receiving-End Date-Time Generator 455

The receiving-end date-time generator 455 receives the distributing-end random number from the receiver 451. The receiving-end date-time generator 455 then acquires, as a reference date-time, a date-time clocked by the timer 452 at the instant when the distributing-end random number is received. Successively, the receiving-end date-time generator 455 generates a receiving-end date-time by adding the reference date-time and a date-time difference identified by a difference ID that matches the current difference information. The receiving-end date-time generator 455 sends, to a signature generator 456, the thus generated receiving-end date-time, the difference designation information that is a difference ID matching the current difference information, and the distributing-end random number.

Signature Generator 456

The signature generator 456 generates a digital signature. To this end, the signature generator 456 generates and stores, in advance, the receiving-end public key and the corresponding receiving-end secret key. The receiving-end public key is given in advance to the distribution apparatus 30.

The signature generator 456 concatenates the receiving-end date-time, the difference designation information, and the distributing-end random number each received from the receiving-end date-time generator 455, and generates a digital signature, as a receiving-end digital signature, from the concatenated data.

The signature generator 456 then sends, to a sender 460, the receiving-end date-time, the difference designation information, the thus generated receiving-end signature. After generating the receiving-end signature, the signature generator 456 sends a random number generation request to a random number generator 457.

Random Number Generator 457

The random number generator 457 generates, upon receipt of a random number generation request from the signature generator 456, a random number as a receiving-end random number, and then sends the generated receiving-end random number to the sender 460.

Signature Verifier 458

The signature verifier 458 verifies a received signature. To this end, the signature verifier 458 pre-stores the distributing-end public key generated by the distribution apparatus 30.

The signature verifier 458 receives the expiry information, the difference designation information, the distributing-end signature, and from the receiver 451. Upon receipt, the signature verifier 458 verifies the distributing-end signature with the use of the distributing-end public key in order to judge whether the expiry information and/or the difference designation information has been tampered.

When the distributing-end signature is invalid, the signature verifier 458 judges that the expiry information and/or the difference designation information has been tampered, and terminates the processing. When the distributing-end signature is valid, on the other hand, the signature verifier 458 judges that no tampering has been made to the expiry information and the difference designation information, and sends the expiry information and the difference designation information to a playback permission judging unit 459.

Playback Permission Judging Unit 459

The playback permission judging unit 459 acquires a judgment date-time that is a date-time clocked by the timer 452 at the instant when the expiry information is received. The playback permission judging unit 459 then reads, from the memory 454, a date-time difference that is identified by the received difference designation information, and generates a playback date-time by adding the read date-time difference to the judgment date-time.

The playback permission judging unit 459 judges that playback of the requested content is permitted in the case where the playback date-time is equal to or before the date-time shown by the expiry information, while judging that playback of the content is prohibited when the playback date-time is after the date-time shown by the expiry information.

The playback permission judging unit 459 instructs the sender 460 to send the judgment result as playback permission information to the content processor 41.

Sender 460

The sender 460 sends, to the content processor 41, various information items received from the signature generator 456, the random number generator 457, and the playback permission judging unit 459.

To be more specific, the sender 460 sends, to the content processor 41, the receiving-end date-time, the difference designation information, and the receiving-end signature each received from the signature generator 456, the receiving-end random number received from the random number generator 457, and the playback permission information received from the playback permission judging unit 459.

2.2 Operations

Now, description is given to the overall operations of the content distribution system consistent with the second embodiment with reference to the drawings.

Figure 10:
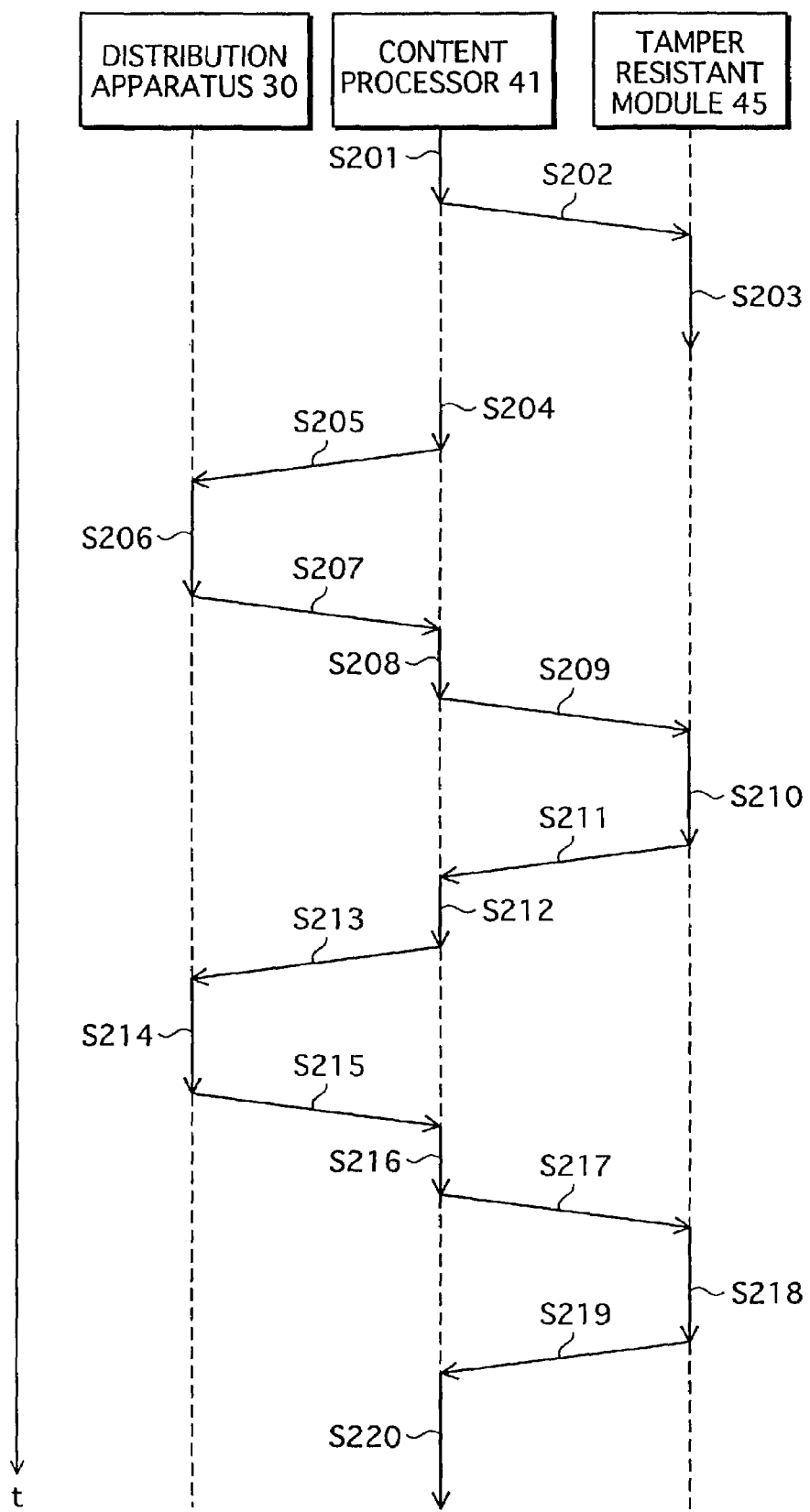
FIG. 10 is a view showing the process flow of the content distribution operations performed by the content distribution system according to the second embodiment of the present invention.

FIG. 10 is a view showing the process flow of the content distribution operations performed by the content distribution system 2.

Here, the distribution apparatus 30 stores a first content of which content ID is "1", and a user of the reception apparatus 40 requests the first content for playback. The usage expiry date-time of the first content is 14:10:00 of Jan. 24, 2003, which is represented by the value 1043385000.

First, the user inputs to the content processor 41 a user date-time with the remote controller (step S201). The user date-time in this example is 14:00:00 of Jan. 24, 2003 represented by the value 1043384400.

The content processor 41 sends the user date-time to the tamper resistant module 45 (step S202).

In response, the tamper resistant module 45 receives the user date-time from the content processor 41 (step S203). In addition, the tamper resistant module 45 acquires a date-time clocked by the timer 452 at the instant when the user date-time is received.

Suppose that the date-time acquired herein has a value 1043385300 representing 14:15:00 of Jan. 24, 2003.

The tamper resistant module 45 calculates, as a date-time difference, a difference between the thus acquired date-time and the user date-time. In this example, the date-time difference is calculated as follows: 1043384400−1043385300=−900

The tamper resistant module 45 generates a difference ID for identifying the thus calculated date-time difference. In this example, the difference ID generated herein has a value "1". The tamper resistant module 45 stores the difference ID and the date-time difference in association with each other. Additionally, the tamper resistant module 45 stores a most-recently stored difference ID as current difference information.

The steps S201, S202, and S203 may be performed repeatedly. In the case of repeatedly performing those steps, each time a user date-time is inputted, the tamper resistant module 45: calculates a date-time difference; generates a difference ID in such a manner that no difference ID has a same value as another difference ID; and stores the calculated date-time difference with the corresponding difference ID. The above steps are repeated until there are a predetermined number of date-time differences are stored along with their difference IDs.

To request playback of the content whose content ID is "1", the user of the content processor 41 inputs, with the remote controller, the value "1" as the content designation information (step S204), so that the content processor 41 acquires the content designation information.

The content processor 41 sends the acquired content designation information to the distribution apparatus 30 (step S205).

The distribution apparatus 30 receives the content designation information from the content processor 41 (step S206).

The distribution apparatus 30 then generates a distributing-end random number that is used to make a request for a receiving-end date-time that in turn is used for adjusting the usage expiry date-time of the requested content. The distribution apparatus 30 sends the distributing-end random number to the content processor 41 (step S207).

The content processor 41 receives the distributing-end random number (step S208).

The content processor 41 then sends the distributing-end random number to the tamper resistant module 45 (step S209).

The tamper resistant module 45 receives the distributing-end random number (step S210). Upon receipt of the distributing-end random number, the tamper resistant module 45 generates a reference date-time that is a date-time clocked by the timer 452 at the instant when the distributing-end random number is received.

In this example, the reference date-time is 14:16:00 represented by the value 1043385360.

The tamper resistant module 45 regards a value matching the current difference information as difference designation information, and then calculates a receiving-end date-time by adding, to the reference date-time, a date-time difference that corresponds to the difference designation information.

In this example, the current difference information has a value "1", and the date-time difference corresponding to that difference designation information is −900. Accordingly, the receiving-end date-time is calculated as follows: 1043385360+(−900)=1043384460.

The tamper resistant module 45 generates a digital signature, as a receiving-end digital signature, from the distributing-end random number, the receiving-end date-time, and the difference designation information. In addition, the tamper resistant module 45 generates a receiving-end random number.

The tamper resistant module 45 then sends, to the content processor 41, the difference designation information, the receiving-end date-time, the receiving-end signature, and the receiving-end random number (step S211).

The content processor 41 receives the difference designation information, the receiving-end date-time, the receiving-end signature, and the receiving-end random number (step S212).

The content processor 41 sends, to the distribution apparatus 30, the difference designation information, the receiving-end date-time, the receiving-end signature, and the receiving-end random number (step S213).

The distribution apparatus 30 receives the difference designation information, the receiving-end date-time, the receiving-end signature, and the receiving-end random number (step S214).

Upon receipt, the distribution apparatus 30 verifies the receiving-end signature. When the receiving-end signature is valid, the distribution apparatus 30 generates expiry information using the receiving-end date-time, a distributing-end date-time, and a usage expiry date-time of the content. The distributing-end date-time is a date-time clocked by the timer 305 at the instant when the receiving-end date-time is received.

Suppose, for example, the distributing-end date-time has a value 1043385420, the expiry information is calculated by the following expression: the expiry information=the usage expiry date-time+(the receiving-end date-time−the distributing-end date-time), which in this example is substituted by the following values: 1043384040=1043385000+(1043384460−1043385420).

The distribution apparatus 30 generates a digital signature, as a distributing-end digital signature, from the expiry information and the difference designation information.

The distribution apparatus 30 then sends the expiry information, the difference designation information, and the distributing-end signature to the content processor 41 (step S215).

The content processor 41 receives the expiry information, the difference designation information, and the distributing-end signature (step S216).

The content processor 41 sends the expiry information, the difference designation information, and the distributing-end signature to the tamper resistant module 45 (step S217).

The tamper resistant module 45 receives the expiry information, the difference designation information, and the distributing-end signature (step S218).

Upon receipt, the tamper resistant module 45 verifies the distributing-end signature in order to confirm that the expiry information has not been tampered. When the expiry information has not been tampered, the tamper resistant module 45 stores the expiry information and the difference designation information in association with each other.

Next, the tamper resistant module 45 judges whether the requested content is permitted to be played back. To this end, the tamper resistant module 45 generates a playback date-time by adding a date-time difference that is identified by the difference designation information to a date-time that is clocked by the timer 452 at the instant when the expiry information is received.

When the playback date-time is equal to or before the date-time shown by the expiry information, the tamper resistant module 45 judges that playback of the content is permitted. On the other hand, when the playback date-time is after the date-time shown by the expiry information, the tamper resistant module 45 judges that playback of the content is prohibited.

The tamper resistant module 45 in this example judges that playback of the content is permitted when the playback date-time has a value that is smaller than 1043384040, which is the value of the expiry information.

The tamper resistant module 45 sends, to the content processor 41, playback permission information showing, according to the judgment result, whether playback of the content is permitted (step S219).

The content processor 41 receives the playback permission information (step S220). When the playback permission information shows permission, the content processor 41 plays back the requested content. On the other hand, when the playback permission information shows prohibition, the content processor 41 terminates playback operations of the requested content, if such operations are being performed.

Third Embodiment

Figure 11:
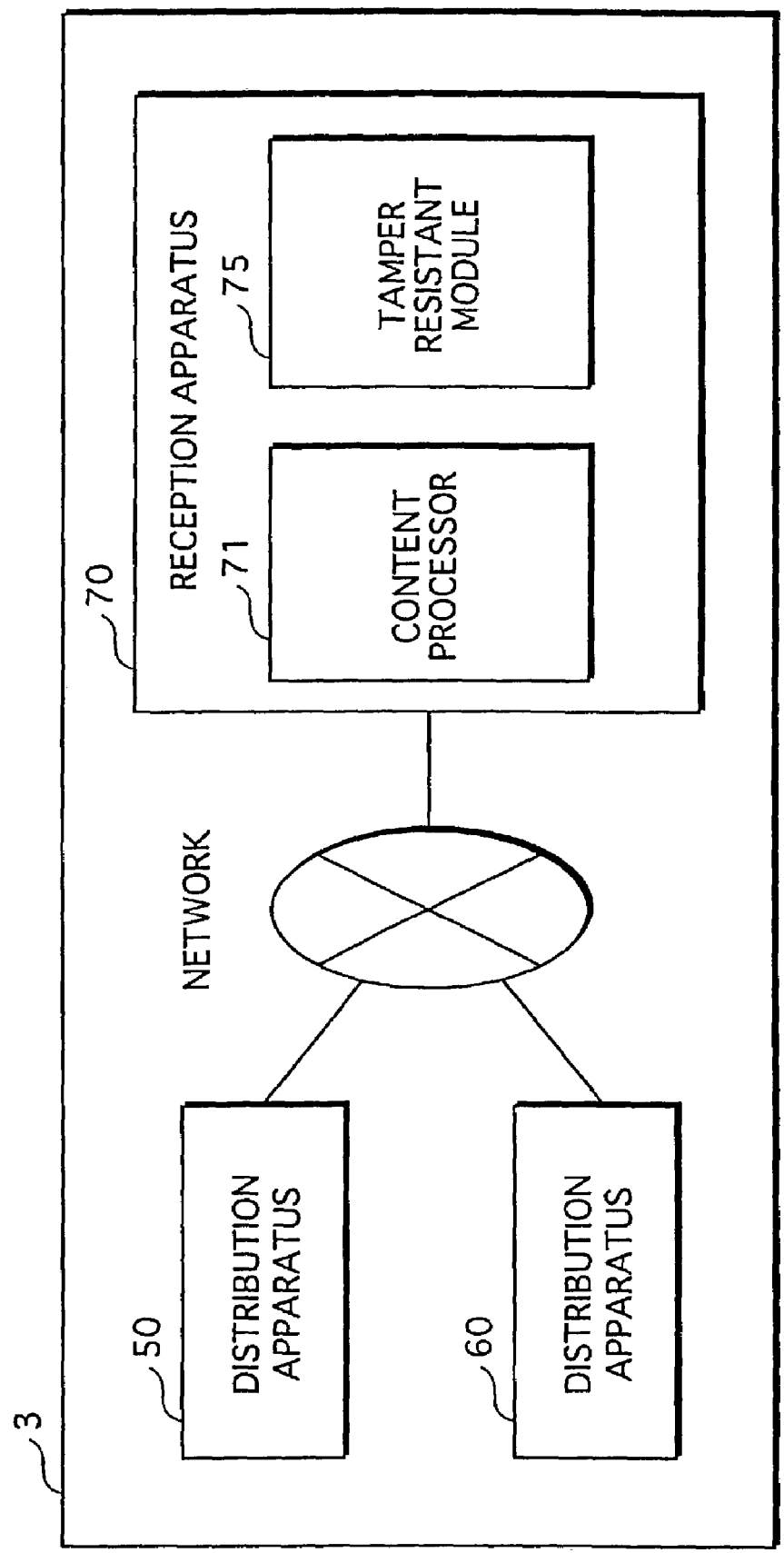
FIG. 11 is a block diagram showing the construction of a content distribution system according to a third embodiment of the present invention.

FIG. 11 is a block diagram showing the construction of a content distribution system 3.

Distribution apparatuses 50 and 60 each pre-stores contents and a usage expiry date-time of each content, and separately communicates with a reception apparatus 70 via a network.

The distribution apparatus 50 receives a content distribution request from the reception apparatus 70, and in response sends a requested content and a usage expiry date-time of that content to the reception apparatus 70.

Similarly, the distribution apparatus 60 receives a content distribution request from the reception apparatus 70, and in response sends a requested content and a usage expiry date-time of that content to the reception apparatus 70.

The reception apparatus 70 then receives the content and the usage expiry date-time of that content, and judges whether playback of the content is permitted, and plays back the content on judging that it is permitted.

The reception apparatus 70 is composed of a content processor 71 and a tamper resistant module 75 that are electrically connected to each other via a bus. The tamper resistant module 75 makes the playback permission judgment, and the content processor 71 performs the playback of content accordingly to the playback permission judgment.

3.1.1 Distribution Apparatus 50

Figure 12:
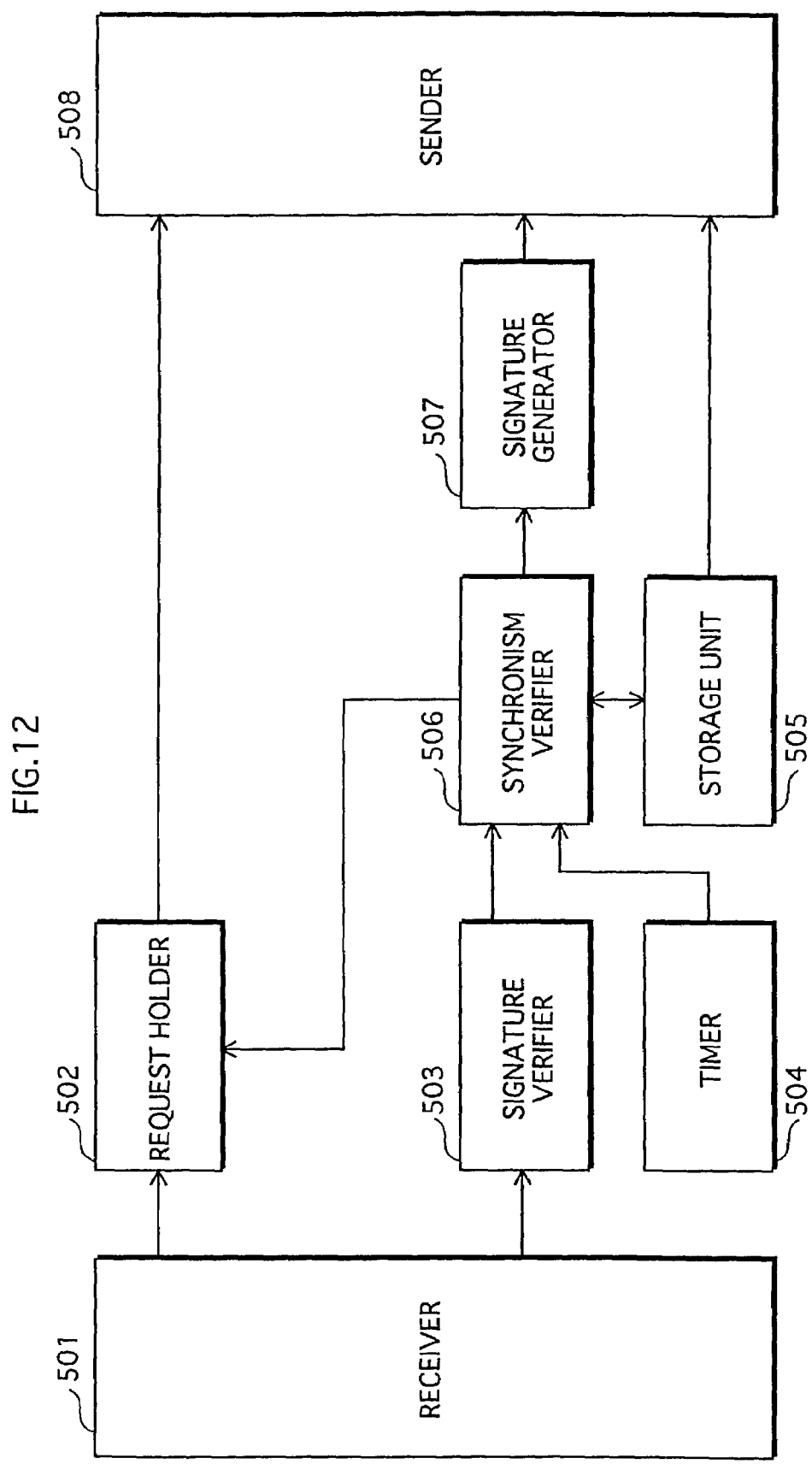
FIG. 12 is a block diagram showing the construction of a distribution apparatus shown in FIG. 11.

FIG. 12 is a block diagram showing the construction of the distribution apparatus 50.

The distribution apparatus 50, to be precise, is a computer system composed basically of a microprocessor, ROM, RAM, a hard disk, and a liquid crystal display unit. The RAM stores a computer program. The distribution apparatus 50 performs its function by the microprocessor operating according to the program.

The distribution apparatus 60 is similar in construction to the distribution apparatus 50, so that description thereof is omitted.

Receiver 501

A receiver 501 receives various information items from the reception apparatus 70 via the network.

The receiver 501 sends content designation information received from the reception apparatus 70 to a request holder 502. The content designation information is information sent from the reception apparatus 70 to the distribution apparatus 50 upon making a content distribution request, and shows a content requested to be distributed.

In addition, the receiver 501 sends, to a signature verifier 503, a receiving-end date-time and a receiving-end signature each received from the reception apparatus 70.

The receiving-end date-time is a date-time generated by the reception apparatus 70, and used to confirm synchronization between a timer of the distribution apparatus 50 and a timer of the reception apparatus 70. The receiving-end signature is generated by the reception apparatus 70, and used to detect any tampering made to the receiving-end date-time.

Request Holder 502

The request holder 502 holds the content designation information received from the receiver 501. Upon receipt of the content designation information, the request holder 502 instructs a sender 508 to issue a request to the reception apparatus 70 for transmission of receiving-end date-time.

Signature Verifier 503

The signature verifier 503 verifies a signature received from the receiver 501. To this end, the signature verifier 503 pre-stores a receiving-end public key generated by the reception apparatus 70.

The signature verifier 503 receives the receiving-end date-time and the receiving-end signature from the receiver 501. Upon receipt, the signature verifier 503 verifies the receiving-end signature with the use of the receiving-end public key in order to judge whether the receiving-end date-time has been tampered.

When the receiving-end signature is invalid, the signature verifier 503 judges that the receiving-end date-time has been tampered, and terminates the processing. When the receiving-end signature is valid, on the other hand, the signature verifier 503 judges that the receiving-end date-time has not been tampered, and sends the receiving-end date-time to a synchronization verifier 506.

Timer 504

A timer 504 counts up by one for every second and the counting assumed to have been started on Jan. 1, 1970.

Storage Unit 505

A storage unit 505 pre-stores contents to be sent to the reception apparatus 70, and each content is associated with a content ID and a usage expiry date-time that are also stored in the storage unit 505. Each usage expiry date-time is expressed in seconds counted from Jan. 1, 1970.

Synchronism Verifier 506

The synchronism verifier 506 judges whether the difference between the date-time clocked by the timer 504 and the date-time clocked by the timer of the reception apparatus 70 is within a predetermined difference.

To be more specific, the synchronism verifier 506 receives the receiving-end date-time from the signature verifier 503, and acquires, as a distributing-end date-time, the date-time clocked by the timer 504 at the instant when the receiving-end date-time is received. The synchronism verifier 506 then calculates the difference between the receiving-end date-time and the distributing-end date-time, and compares the thus calculated difference with the predetermined difference, which in this example is five minutes.

When the value of calculated difference is less than or equal to five minutes, the synchronism verifier 506 judges that the two timers are in synchronized. On the other hand, when the value of calculated difference is greater than five minutes, the synchronism verifier 506 judges that the two timers are out of synchronization.

For example, suppose that the value of receiving-end date-time is 1043384880 that represents 14:08:00 of Jan. 24, 2003, and the value of distributing-end date-time is 1043385060 representing 14:11:00 of Jan. 24, 2003, the difference is −180(=1043384880−1043385060). Here, the absolute value of the thus calculated difference is smaller than 300 that is equivalent to five minutes. Consequently, it is judged that the two timers are synchronized.

When judging that the two timers are in synchronized, the synchronism verifier 506 reads from the storage unit 505 a content that is identified by a content ID matching the content designation information that is held in the request holder 502. The synchronism verifier 506 then generates distributing-end information from the read usage expiry date-time and an information type.

When judging, on the other hand, that the two timers are asynchronous, the synchronism verifier 506 newly acquires, as the distributing-end date-time, a date-time clocked by the timer 504 at the instant when the judgment is made, and generates distributing-end information from the newly-acquired distributing-end date-time and the information type.

The information type shows whether the distributing-end information contains the usage expiry date-time or the distributing-end date-time. For example, the type information is set "1" to indicate that the distributing-end information contains the usage expiry date-time, and set to "2" to indicate that the distributing-end information contains the distributing-end date-time.

The synchronism verifier 506 sends the distributing-end information to a signature generator 507.

Signature Generator 507

The signature generator 507 generates a digital signature. To this end, the signature generator 507 generates, in advance, a distributing-end public key and a corresponding distributing-end secret key for use in digital signature generation and verification, respectively. The distributing-end public key is given in advance to the reception apparatus 70.

The signature generator 507 generates, using the distributing-end secret key, a digital signature from the distributing-end information that is received from the synchronism verifier 506, thereby obtaining a distributing-end signature.

The signature generator 507 instructs the sender 508 to send the distributing-end information and the distributing-end signature.

Sender 508

In response to the instructions from the request holder 502 and the signature generator 507, the sender 508 sends various information items to the reception apparatus 70 via the network.

To be more specific, the sender 508 sends, to the reception apparatus 70, the request for receiving-end date-time according to the instructions from the request holder 502. In addition, the sender 508 sends, to the reception apparatus 70, the distributing-end information and the distributing-end signature according to the instructions from the signature generator 507.

3.1.2 Content Processor 71

Figure 13:
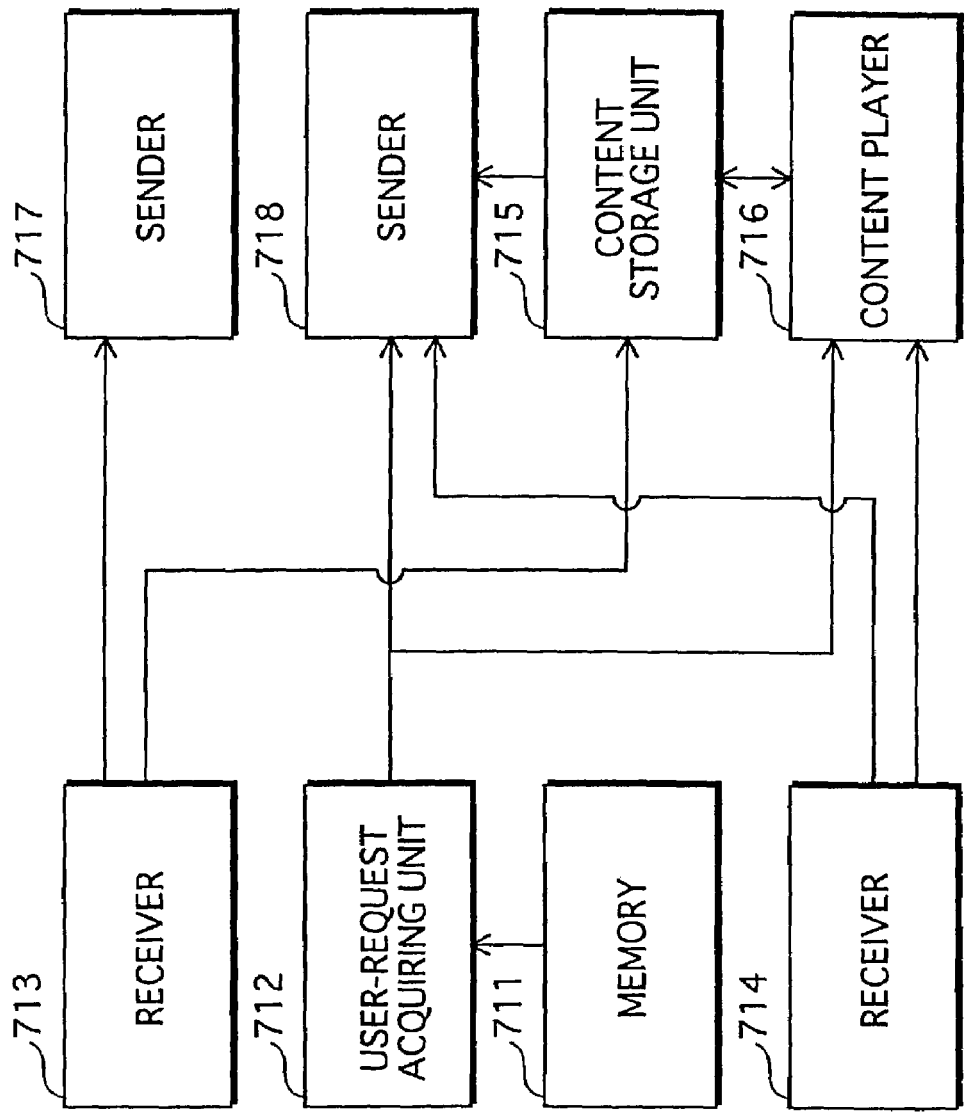
FIG. 13 is a block diagram showing the construction of a content processor shown in FIG. 11.

FIG. 13 is a block diagram showing the construction of the content processor 71.

The content processor 71, to be precise, is a computer system composed basically of a microprocessor, ROM, RAM, a hard disk, a liquid crystal display unit, and a remote controller. The RAM stores a computer program. The content processor 71 performs its function by the microprocessor operating according to the program.

Memory 711

A memory 711 stores content IDs each identifying a content, together with apparatus IDs each showing a distribution apparatus in which a corresponding content is stored.

User-Request Acquiring Unit 712

A user-request acquiring unit 712 acquires information inputted by the user with the remote controller to designate a content requested for playback. The user-request acquiring unit 712 then refers to the information stored in the memory 711 to acquire an apparatus ID that corresponds to the content ID matching the content designation information.

The user-request acquiring unit 712 then sends the apparatus ID and the content designation information to a sender 718.

Receiver 713

A receiver 713 receives various information items from the distribution apparatus 50 or 60 via the network.

To be more specific, the receiver 713 receives a request for receiving-end date-time from the distribution apparatus 50 or 60. In response, the receiver 713 sends, to a sender 717, the receiving-end date-time request together with an apparatus ID identifying the distribution apparatus that made the request.

In addition, the receiver 713 sends, to the sender 717, the distributing-end information and the distributing-end signature both received from the distribution apparatus 50 or 60, together with the apparatus ID that identifies the distribution apparatus being the transmission source.

The receiver 713 receives the requested content and the content ID from the distribution apparatus 50 or 60, and stores, into a content storage unit 715, the content and the content ID in association with each other.

Receiver 714

A receiver 714 receives various information items from the tamper resistant module 75 that is electrically connected thereto via the bus.

The receiver 714 then sends, to the sender 718, the apparatus ID, the receiving-end date-time, and the receiving-end signature all received from the tamper resistant module 75. In addition, the receiver 714 sends, to a content player 716, playback permission information of the content that is received from the tamper resistant module 75. The playback permission information shows whether playback of the content is permitted.

Content Storage Unit 715

The content storage unit 715 stores, in association with each other, the content and the corresponding content ID both received from the receiver 713.

Content Player 716

The content player 716 controls playback operations of the content based on the playback permission information received from the receiver 714.

To be more specific, the content player 716 holds the content designation information from the user-request acquiring unit 712. In addition, the content player 716 receives the playback permission information from the receiver 714.

When the playback permission information shows permission, the content player 716 reads, from the content storage unit 715, a content that is identified by the content ID matching the currently held content designation information, and plays back the read content. When the playback information shows prohibition, on the other hand, the content player 716 terminates playback operations of the content that is identified by the content ID matching the currently held designation information, if such operations are being performed.

Sender 717

According to the instructions received from the receiver 713, the sender 717 sends various information items to the tamper resistant module 75 via the bus.

To be more specific, the sender 717 sends, to the tamper resistant module 75, the apparatus ID and the receiving-end date-time request both received from the receiver 713.

Sender 718

The sender 718 sends various information items to the distribution apparatus 50 via the network according to the instructions from the user-request acquiring unit 712 and the receiver 714.

To be more specific, the sender 718 receives the apparatus ID and the content designation information from the user-request acquiring unit 712. The sender 718 then sends the content designation information selectively to the distribution apparatus 50 or 60 as identified by the received apparatus ID.

In addition, the sender 718 receives, from the receiver 714, the apparatus ID, the receiving-end date-time, and the receiving-end signature, and sends the receiving-end date-time and the receiving-end signature selectively to the distribution apparatus 50 or 60 as identified by the received apparatus ID.

3.1.3 Tamper Resistant Module 75

In terms of hardware, the tamper resistant module 75 is composed basically of a CPU, ROM, and RAM. The ROM stores a computer program, and the tamper resistant module 75 performs its function by the CPU operating according to the program.

The tamper resistant module 75 is provided with protection against direct access from an external source to the data stored in the ROM and RAM.

Figure 14:
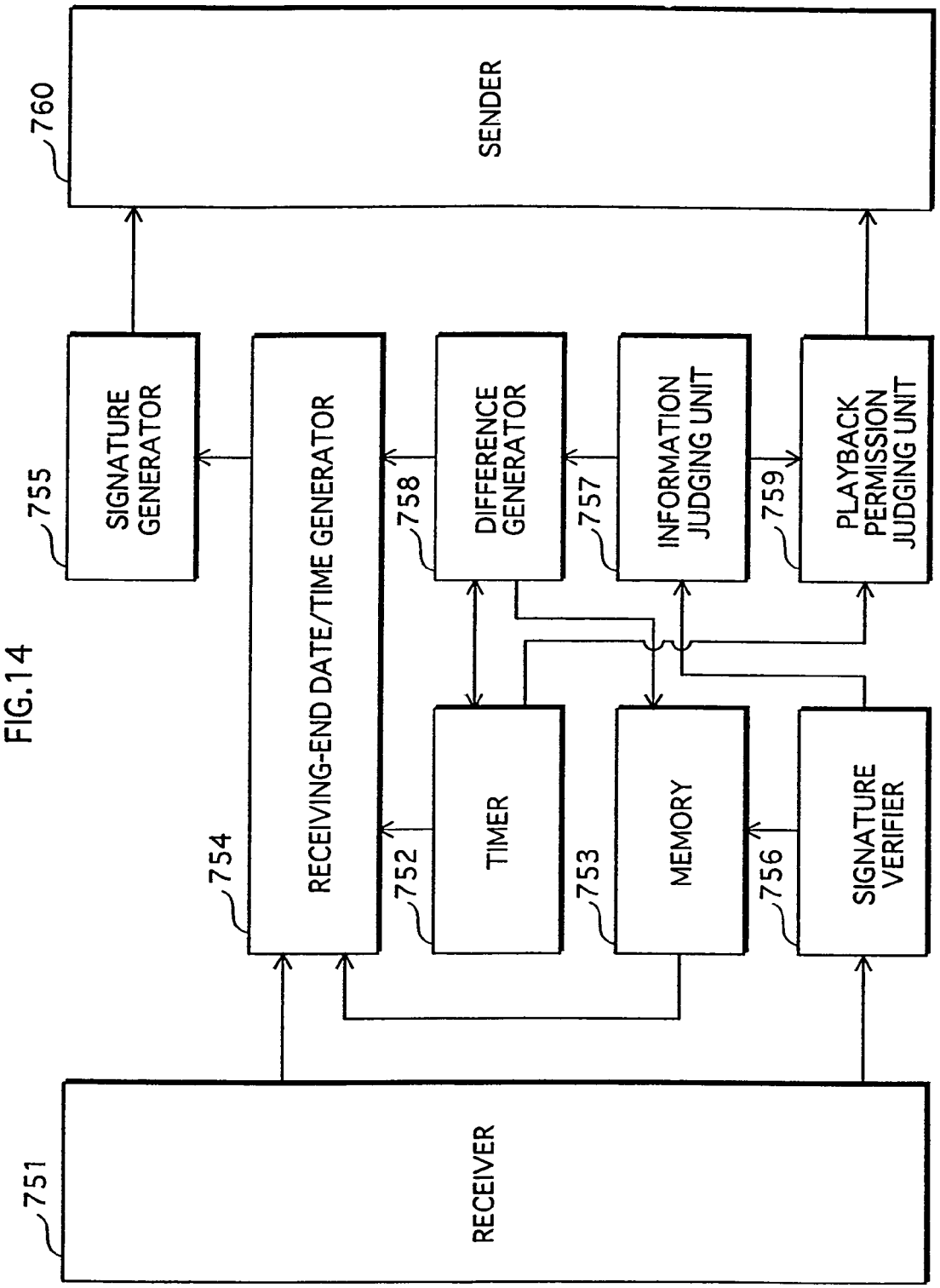
FIG. 14 is a block diagram showing the construction of a tamper resistant module shown in FIG. 11.

FIG. 14 is a block diagram showing the construction of the tamper resistant module 75.

Receiver 751

A receiver 751 receives various information items from the content processor 71 that is electrically connected thereto via the bus.

The receiver 751 receives the apparatus ID and the receiving-end date-time request from the content processor 71, and sends the received apparatus ID and the receiving-end date-time request to a receiving-end date-time generator 754.

The receiver 751 sends, to a signature verifier 756, the apparatus ID, the distributing-end information, and the distributing-end signature all received from the content processor 71.

Timer 752

A timer 752 counts up by one for every second and the counting assumed to have been started on Jan. 1, 1970.

Memory 753

A memory 753 stores, correspondingly to each distribution apparatus, an apparatus ID identifying a distribution apparatus, along with a master ID and a date-time difference. Each master ID is pre-stored, in the memory 753, in association with one of the apparatuses IDs, and shows a distribution apparatus on which that distribution apparatus depends.

The memory 753 receives the apparatus ID and the date-time difference from a difference generator 758. The memory 753 replaces the date-time difference that is identified by the apparatus ID with the received date-time difference. In addition, if there is a date-time difference of which master ID matches the received apparatus ID, the memory 753 replaces that date-time with the receive date-time difference.

Receiving-End Date-Time Generator 754

The receiving-end date-time generator 754 receives the apparatus ID and the receiving-end date-time request from the receiver 751.

The receiving-end date-time generator 754 holds the received apparatus ID.

The receiving-end date-time generator 754 generates, upon receipt of the receiving-end date-time request from the receiver 751 or from the difference generator 758, a receiving-end date-time by adding to the date-time clocked by the timer 752 at that instant to the date-time difference corresponding to the received apparatus ID. The receiving-end date-time generator 754 sends the apparatus ID and the thus generated receiving-end date-time to a signature generator 755.

Signature Generator 755

The signature generator 755 generates a digital signature. To this end, the signature generator 755 generates and stores, in advance, the receiving-end public key and the corresponding receiving-end secret key. The receiving-end public key is given, in advance, to the distribution apparatus 50.

The signature generator 755 receives the apparatus ID and the receiving-end date-time from the receiving-end date-time generator 754. Upon receipt, the signature generator 755 generates a digital signature, as a receiving-end digital signature, from the receiving-end date-time. The signature generator 755 sends the apparatus ID, the receiving-end date-time, and the receiving-end digital signature to a sender 760.

Signature Verifier 756

The signature verifier 756 verifies a received signature. To this end, the signature verifier 756 pre-stores the distributing-end public key generated by the distribution apparatus 50.

To be more specific, the signature verifier 756 receives the apparatus ID and the distributing-end information, and the distributing-end signature from the receiver 751. Upon receipt, the signature verifier 756 verifies the distributing-end signature with the user of the distributing-end public key in order to judge whether the distributing-end information has been tampered.

When the distributing-end signature is invalid, the signature verifier 756 judges that the distributing-end information has been tampered, and terminates the processing. When the distributing-end signature is valid, on the other hand, the signature verifier 756 judges that no tampering has been made to the distributing-end information, and sends, to an information judging unit 757, the apparatus ID and the distributing-end information.

Information Judging Unit 757

The information judging unit 757 receives the apparatus ID and the distributing-end information from the signature verifier 756. The information judging unit 757 then analyzes the type information contained in the distributing-end information.

When judging that the distributing-end information contains a usage expiry date-time, the information judging unit 757 sends the usage expiry date-time to a playback permission judging unit 759. On the other hand, when judging that the distributing-end information contains a distributing-end date-time, the information judging unit 757 sends the distributing-end date-time and the apparatus ID to the difference generator 758.

Difference Generator 758

The difference generator 758 receives the apparatus ID and the distributing-end date-time from the information judging unit 757.

The difference generator 758 calculates the date-time difference between the received distributing-end date-time and a date-time clocked by the timer 752 at the instant when the distributing-end date-time is received, and sends the thus calculated date-time difference and the apparatus ID to the memory 753. In addition, the difference generator 758 sends, to the receiving-end date-time generator 754, a request for receiving-end date-time transmission.

Playback Permission Judging Unit 759

The playback permission judging unit 759 acquires a judgment date-time that is a date-time clocked by the timer 752 at the instant when the expiry information is received. The playback permission judging unit 759 then judges that playback of the content is permitted when the judgment date-time is equal to or before the date shown by the expiry information, while judging that playback of the content is prohibited when the judgment date-time is after the date-time shown by the expiry information.

The playback permission judging unit 759 instructs the sender 760 to send, to the content processor 71, the judgment result as playback permission information.

Sender 760

The sender 760 sends various information items received from the signature generator 755 and the playback permission judging unit 759 to the content processor 71.

To be more specific, the sender 760 sends, to the content processor 71, the apparatus ID, the receiving-end date-time, and the receiving-end signature each received from the signature generator 755, and the playback permission information received from the playback permission judging unit 759.

3.2 Operations

Now, description is given to the overall operation of the content distribution system consistent with the third embodiment with reference to the drawings.

Figure 15:
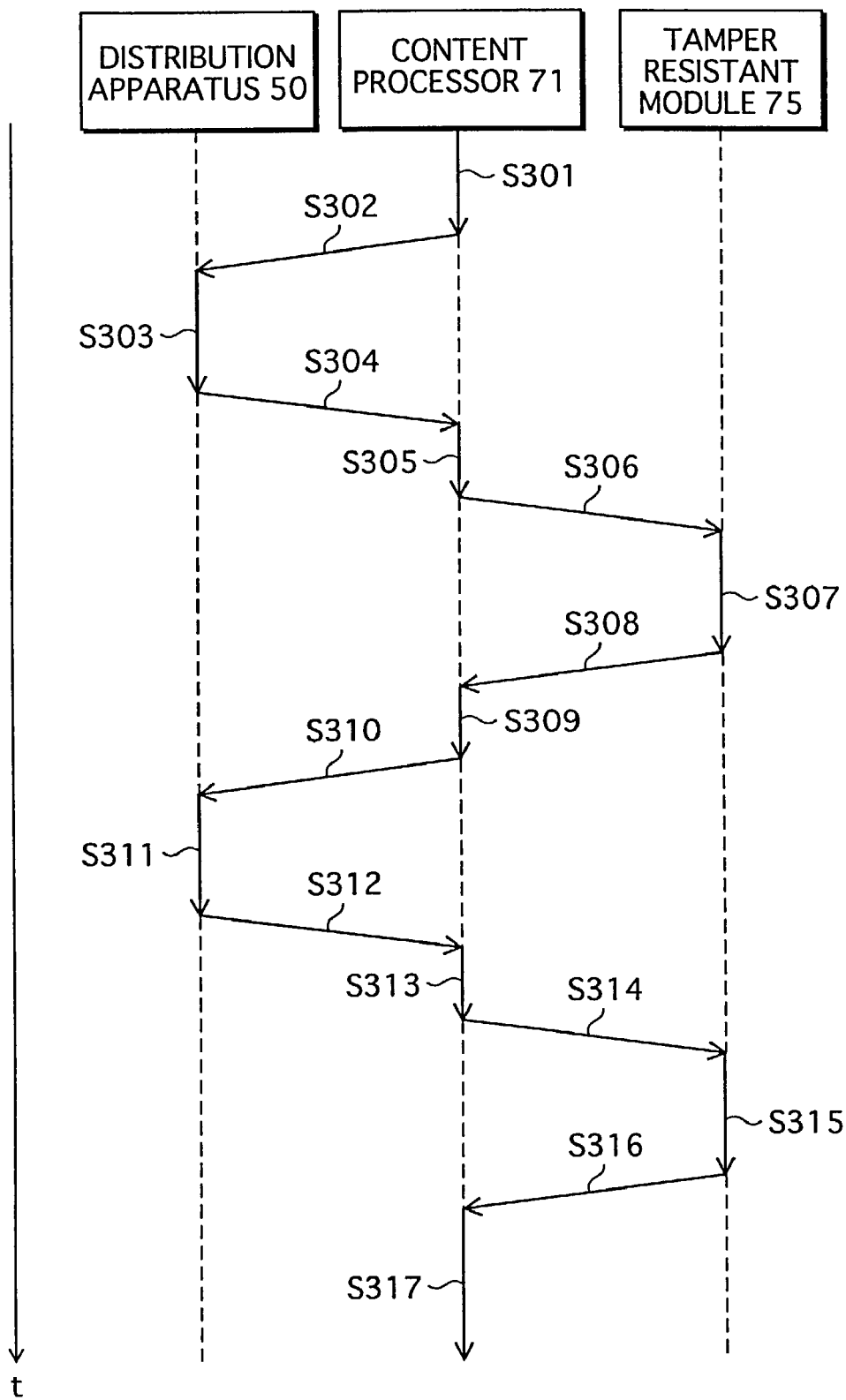
FIG. 15 is a view showing the process flow of the content distribution operations performed by the content distribution system according to the third embodiment of the present invention.

FIG. 15 is a view showing process flow of the content distribution operations performed by the content distribution system 3.

Here, the distribution apparatus 50 stores a first content of which content ID is "1". A user of the reception apparatus 50 requests the first content for playback. Similarly, a user of the reception apparatus 70 requests the first content for play back. The usage expiry date-time of the first content is 14:20:00 of Jan. 24, 2003, which is represented by the value 1043385600.

For requesting playback of the first content, the user of the content processor 71 inputs, as content designation information, the content ID (a value "1" in this case) with the remote controller (step S301).

Next, the content processor 71 sends the content designation information to the distribution apparatus 50 (step S302).

In response, the distribution apparatus 50 receives the content designation information, and stores a value "1" shown by the received content designation information (step S303).

Next, the distribution apparatus 50 sends a receiving-end date-time request to the content processor 71 (step S304).

In response, the content processor 71 receives the receiving-end date-time request (step S305).

The content processor 71 then sends the receiving-end date-time request to the tamper resistant module 75 (step S306).

In response, the tamper resistant module 75 receives the receiving-end date-time request (step S307).

Upon receipt of the request, the tamper resistant module 75 generates a receiving-end date-time, and then generates a digital signature from that receiving-end date-time.

The tamper resistant module 75 sends the receiving-end date-time and the receiving-end signature to the content processor 71 (step S308).

In response, the content processor 71 receives the receiving-end date-time and the receiving-end signature (step S309).

Next, the content processor 71 sends the receiving-end date-time and the receiving-end signature to the distribution apparatus 50 (step S310).

In response, the distribution apparatus 50 receives the receiving-end date-time and the receiving-end signature (step S311).

The distribution apparatus 50 verifies the receiving-end signature. When judging through the verification that the receiving-end date-time has not been tampered, the distribution apparatus 50 calculates the difference between the receiving-end date-time and a date-time clocked by the timer 504 at the instant when the receiving-end date-time is received, and compares the thus calculated difference with the predetermined value of 300, which is equivalent to five minutes.

When the calculated difference is less than or equal to five minutes, the distribution apparatus 50 judges that the two timers are synchronized. On the other hand, when the calculated difference is greater than five minutes, the distribution apparatus 50 judges that the two timers are out of synchronized.

When judging that the two timers are synchronized, the distribution apparatus 50 generates distributing-end information from the usage expiry date-time of the content that is identified by the content ID matching the content designation information and a corresponding information type.

On the other hand, when judging that the two timers are out of synchronization, the synchronism verifier 506 acquires a distributing-end date-time that is a date-time clocked by the timer 504 at the instant when the judgment is made, and generates distributing-end information from the distributing-end date-time and a corresponding information type.

The distribution apparatus 50 generates, as a distributing-end digital signature, a digital signature from the thus generated distributing-end information.

Next, the distribution apparatus 50 sends the distributing-end information and the distributing-end digital signature to the content processor 71 (step S312).

In response, the content processor 71 receives the distributing-end information and the distributing-end signature (step S313).

The content processor 71 then sends the distributed-end information and the distributing-end signature to the tamper resistant module 75 (step S314).

In response, the tamper resistant module 75 receives the distributing-end information and the distributing-end signature (step S315).

Upon receipt, the tamper resistant module 75 verifies the distributing-end signature.

When the distributing-end signature is valid, the tamper resistant module 75 analyzes the distributing-end information.

When it is analyzed that the distributing-end information contains the distributing-end date-time, the tamper resistant module 75 calculates and stores therein a difference between the distributing-end date-time and a date-time clocked by the timer 752 at the instant when the distributing-end date-time is received. Thereafter, the step S307 and the following steps are repeated.

On the other hand, when it is analyzed that the distributing-end information contains the usage expiry date-time of the requested content, the tamper resistant module 75 judges whether playback of the content is permitted.

The tamper resistant module 75 then sends, to the content processor 71, playback permission information according to the judgment result (step S316).

In response, the content processor 71 receives the playback permission information (step S317).

When the playback permission information shows permission, the content processor 71 plays back the content. When the playback permission information shows prohibition, the content processor 71 terminates playback operations of the content.

The distribution apparatus 60 performs operations similar to those performed by the distribution apparatus 50. To be noted is that the distribution apparatus 60 is subordinate to the distribution apparatus 50.

As described above, the reception apparatus 70 first performs processing operations so that the timers of the distribution apparatus 50 and the reception apparatus 70 are synchronized to each other. The reception apparatus 70 then replaces the date-time difference between the timers of the distribution apparatus 60 and the reception apparatus 70 with that between the timers of the distribution apparatus 50 and the reception apparatus 70.

MODIFICATIONS (1) The present invention may be embodied as a method composed of a set of steps descried in any of the above embodiments. Alternatively, the present invention may be embodied as a computer program for performing any of the methods by a computer. Still further, the present invention may be embodied as digital signals representing any of the computer programs.

Alternatively, the present invention may be embodied as a computer-readable recording medium having any of the above computer programs or digital signals recorded thereon. For example, the present invention may be any of the computer programs or digital signals recorded on a flexible disk, a hard disk, a CD-ROM, an MO, a DVD, a DVD-ROM, a DVD-RAM, a BD (Blu-ray Disc), or a semiconductor memory. Alternatively, the present invention may be embodied as any of the above computer programs or the digital signals recorded on such a recording medium.

Further, the computer programs or digital signals may be sent via telecommunications, wireless or cable communications, or a network typified by the Internet.

Alternatively, the present invention may be embodied as a computer system composed of a microprocessor and a memory. Here, the memory stores any of the above computer programs, and the microprocessor operates according to the stored computer program.

Further, any of the programs or digital signals may be transported in from of a recording medium, or sent over a network, for example. With this arrangement, the programs or digital signals may be performed by a computer system that is separate from and independent of a computer system that is used to record or send the programs or digital signals.

(2) In the above described embodiments, a content and expiry information of the content are sent from a distribution apparatus to a reception apparatus when a user requests playback of the content. However, contents and their expiry information may be stored in the reception apparatus in advance.

(3) In the above described embodiments, a distribution apparatus and a reception apparatus are connected to each other via a network so that communications therebetween is performed via the network. However, the distribution apparatus and the reception apparatus may be electrically connected via a bus, rather than via a network.

(4) In the above described embodiments, a distribution apparatus and a reception apparatus detect information tampering with the use of digital signatures. Instead of the verification by a digital signature, communications between the distribution apparatus and the reception apparatus may be performed after mutual authentication and key sharing, so that information is encrypted with a shared key prior to transmission.

(5) In the third embodiment, the reception apparatus pre-stores master IDs. Alternatively, however, the master IDs may be sent to the reception apparatus from the distribution apparatus.

(6) Each tamper resistant module described in the above embodiments may be a portable memory card such as IC card, so that it is removable from a reception apparatus or a content processor.

(7) The present invention may be embodied as any combination of the above embodiments and modifications.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A digital content distribution system comprising:
   a distribution apparatus operable to distribute content having a usage expiration date-time; and
   a reception apparatus operable to judge whether usage of content received from said distribution apparatus is permitted, said reception apparatus including:
      a user date-time acquiring unit operable to acquire and output a user date-time each time a user designates the user date-time;
      a first timer operable to (i) clock a date-time, and (ii) output, each time the user date-time is acquired by said user date-time acquiring unit, a first date-time clocked at an instant when the user date-time is acquired;
      a storage unit operable to (i) calculate a difference by subtracting the first date-time from the user date-time each time the user date-time and the first date-time are output by said user date-time acquiring unit and said first timer, respectively, (ii) generate a difference ID identifying the calculated difference, and (iii) store the calculated difference and the difference ID identifying the calculated difference, the calculated difference and the difference ID identifying the calculated difference being stored with an association to each other;

a playback request acquiring unit operable to acquire a content ID identifying content designated by the user;

a first sender operable to (i) calculate an adjusted date-time by adding a most recently stored calculated difference to a date-time clocked by said first timer at an instant when the content ID is acquired by said playback request acquiring unit, and (ii) send, to said distribution apparatus, the adjusted date-time, the difference ID identifying the most recently stored calculated difference, and the acquired content ID;

a first receiver operable to receive, from said distribution apparatus in response to the adjusted date-time, the difference ID, and the acquired content ID sent to said distribution apparatus by said first sender, expiration information and the difference ID sent to said distribution apparatus by said first sender; and a judging unit operable, upon receipt of the expiration information and the difference ID received by said first receiver, to judge that usage of the content designated by the user is permitted when a date-time identified by the received expiration information is later than a date-time calculated by adding the calculated difference identified by the received difference ID to a date-time clocked by said first timer at an instant of the judgment by said judging unit, wherein:

said distribution apparatus comprises:

a second receiver operable to receive, from said reception apparatus, the adjusted date-time, the difference ID identifying the most recently stored calculated difference, and the content ID;

a second timer operable to (i) clock a date-time, and (ii) output a second date-time clocked at an instant when the adjusted date-time is received from said reception apparatus; and a second sender operable to (i) calculate a difference by subtracting the second date-time from the adjusted date-time, (ii) generate the expiration information by adding the difference calculated by said second sender to the usage expiration date-time of the content identified by the received content ID, and (iii) send the expiration information and the received difference ID to said reception apparatus.

2. A digital content distribution apparatus for distributing content having a usage expiration date-time to a reception apparatus operable to judge whether usage of received content is permitted, said digital content distribution apparatus comprising:

a receiver operable to receive, from the reception apparatus, (i) an adjusted date-time generated by the reception apparatus by adjusting a date-time clocked by a timer of the reception apparatus, (ii) a difference ID identifying a correction value used in the adjustment of the date-time clocked by the timer, and (iii) a content ID identifying the content;

a timer operable to (i) clock a date-time, and (ii) output a reception date-time clocked at an instant when the adjusted date-time is received from the reception apparatus; and a sender operable to (i) calculate a difference by subtracting the adjusted date-time from the reception date-time, (ii) generate expiration information by adding the difference calculated by said sender to the usage expiration date-time of the content identified by the received content ID, and (iii) send the expiration information and the received difference ID to the reception apparatus to be used by the reception apparatus to judge that usage of the received content is permitted when a date-time identified by the expiration information is later than a date-time calculated by the reception apparatus by adding the correction value identified by the difference ID to a date-time clocked by the reception apparatus at an instant of judging by the reception apparatus.

3. A digital content reception apparatus for receiving content from a distribution apparatus operable to distribute content having a usage expiration date-time, said digital content reception apparatus comprising:

a user date-time acquiring unit operable to acquire and output a user date-time each time a user designates the user date-time;

a timer operable to (i) clock a date-time, and (ii) output, each time the user date-time is acquired by said user date-time acquiring unit, a first date-time clocked at an instant when the user date-time is acquired;

a storage unit operable to (i) calculate a difference by subtracting the first date-time from the user date-time each time the user date-time and the first date-time are output by said user date-time acquiring unit and said timer, respectively, (ii) generate a difference ID identifying the calculated difference, and (iii) store the calculated difference and the difference ID identifying the calculated difference, the calculated difference and the difference ID identifying the calculated difference being stored with an association to each other;

a playback request acquiring unit operable to acquire a content ID identifying content designated by the user;

a sender operable to (i) calculate an adjusted date-time by adding a most recently stored calculated difference to a date-time clocked by said timer at an instant when the content ID is acquired by said playback request acquiring unit, and (ii) send, to the distribution apparatus, the adjusted date-time, the difference ID identifying the most recently stored calculated difference, and the acquired content ID;

a receiver operable to receive, from the distribution apparatus in response to the adjusted date-time, the difference ID, and the acquired content ID sent to the distribution apparatus by said sender, expiration information and the difference ID sent to the distribution apparatus by said sender; and a judging unit operable, upon receipt of the expiration information and the difference ID received by said receiver, to judge that usage of the content designated by the user is permitted when a date-time identified by the received expiration information is later than a date-time calculated by adding the calculated difference identified by the received difference ID to a date-time clocked by said timer at an instant of the judgment by said judging unit.

4. A digital content distribution method for distributing content having a usage expiration date-time to a reception apparatus operable to judge whether usage of received content is permitted, said digital content distribution method comprising:

receiving, from the reception apparatus, (i) an adjusted date-time generated by the reception apparatus by adjusting a date-time clocked by a timer of the reception apparatus, (ii) a difference ID identifying a correction value used in the adjustment of the date-time clocked by the timer, and (iii) a content ID identifying the content;

clocking a date-time and outputting a reception date-time clocked at an instant when the adjusted date-time is received from the reception apparatus; and calculating a difference by subtracting the adjusted date-time from the reception date-time, generating expiration information by adding the calculated difference to the usage expiration date-time of the content identified by the received content ID, and sending the expiration information and the received difference ID to the reception apparatus to be used by the reception apparatus to judge that usage of the received content is permitted when a date-time identified by the expiration information is later than a date-time calculated by the reception apparatus by adding the correction value identified by the difference ID to a date-time clocked by the reception apparatus at an instant of judging by the reception apparatus.

5. A digital content reception method for receiving content from a distribution apparatus operable to distribute content having a usage expiration date-time, said digital content reception method comprising:

acquiring and outputting a user date-time each time a user designates the user date-time;

clocking a date-time and outputting, each time the user date-time is acquired by said acquiring and outputting of the user date-time, a first date-time clocked at an instant when the user date-time is acquired;

calculating a difference by subtracting the first date-time from the user date-time each time the user date-time and the first date-time are output by said acquiring and outputting of the user date-time and said outputting of the first date-time, respectively, generating a difference ID identifying the calculated difference, and storing the calculated difference and the difference ID identifying the calculated difference, the calculated difference and the difference ID identifying the calculated difference being stored with an association to each other;

acquiring a content ID identifying content designated by the user;

calculating an adjusted date-time by adding a most recently stored calculated difference to a date-time clocked by said clocking of the date-time at an instant when the content ID is acquired by said acquiring of the content ID, and sending, to the distribution apparatus, the adjusted date-time, the difference ID identifying the most recently stored calculated difference, and the acquired content ID;

receiving, from the distribution apparatus in response to the adjusted date-time, the difference ID, and the acquired content ID sent to the distribution apparatus, expiration information and the difference ID; and upon receiving the expiration information and the difference ID, judging that usage of the content designated by the user is permitted when a date-time identified by the received expiration information is later than a date-time calculated by adding the calculated difference identified by the received difference ID to a date-time clocked by said clocking of the date-time at an instant of said judging.

6. A digital content distribution program encoded on a computer-readable recording medium, the digital content distribution program for distributing content having a usage expiration date-time to a reception apparatus operable to judge whether usage of received content is permitted, said digital content distribution program causing a digital content distribution apparatus to execute a method comprising:

receiving, from the reception apparatus, (i) an adjusted date-time generated by the reception apparatus by adjusting a date-time clocked by a timer of the reception apparatus, (ii) a difference ID identifying a correction value used in the adjustment of the date-time clocked by the timer, and (iii) a content ID identifying the content;

clocking a date-time and outputting a reception date-time clocked at an instant when the adjusted date-time is received from the reception apparatus; and calculating a difference by subtracting the adjusted date-time from the reception date-time, generating expiration information by adding the calculated difference to the usage expiration date-time of the content identified by the received content ID, and sending the expiration information and the received difference ID to the reception apparatus to be used by the reception apparatus to judge that usage of the received content is permitted when a date-time identified by the expiration information is later than a date-time calculated by the reception apparatus by adding the correction value identified by the difference ID to a date-time clocked by the reception apparatus at an instant of judging by the reception apparatus.

7. A digital content reception program encoded on a computer-readable recording medium, the digital content reception program for receiving content from a distribution apparatus operable to distribute content having a usage expiration date-time, said digital content reception program causing a digital content reception apparatus to execute a method comprising:

acquiring and outputting a user date-time each time a user designates the user date-time;

clocking a date-time and outputting, each time the user date-time is acquired by said acquiring and outputting of the user date-time, a first date-time clocked at an instant when the user date-time is acquired;

calculating a difference by subtracting the first date-time from the user date-time each time the user date-time and the first date-time are output by said acquiring and outputting of the user date-time and said outputting of the first date-time, respectively, generating a difference ID identifying the calculated difference, and storing the calculated difference and the difference ID identifying the calculated difference, the calculated difference and the difference ID identifying the calculated difference being stored with an association to each other;

acquiring a content ID identifying content designated by the user;

calculating an adjusted date-time by adding a most recently stored calculated difference to a date-time clocked by said clocking of the date-time at an instant when the content ID is acquired by said acquiring of the content ID, and sending, to the distribution apparatus, the adjusted date-time, the difference ID identifying the most recently stored calculated difference, and the acquired content ID;

receiving, from the distribution apparatus in response to the adjusted date-time, the difference ID, and the acquired content ID sent to the distribution apparatus, expiration information and the difference ID; and upon receiving the expiration information and the difference ID, judging that usage of the content designated by the user is permitted when a date-time identified by the received expiration information is later than a date-time calculated by adding the calculated difference identified by the received difference ID to a date-time clocked by said clocking of the date-time at an instant of said judging.

* * * * *